(12) United States Patent
Guerrero

(10) Patent No.: US 11,969,648 B2
(45) Date of Patent: Apr. 30, 2024

(54) CONTROL STICK

(71) Applicant: Razer (Asia-Pacific) Pte. Ltd., Singapore (SG)

(72) Inventor: Gil Jr Palma Guerrero, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 18/263,080

(22) PCT Filed: Feb. 8, 2021

(86) PCT No.: PCT/SG2021/050064
§ 371 (c)(1),
(2) Date: Jul. 26, 2023

(87) PCT Pub. No.: WO2022/169408
PCT Pub. Date: Aug. 11, 2022

(65) Prior Publication Data
US 2024/0082701 A1 Mar. 14, 2024

(51) Int. Cl.
*A63F 13/24* (2014.01)
*F21V 8/00* (2006.01)
*G06F 3/0338* (2013.01)

(52) U.S. Cl.
CPC ............ *A63F 13/24* (2014.09); *G02B 6/0045* (2013.01); *G06F 3/0338* (2013.01)

(58) Field of Classification Search
CPC ...... A63F 13/24; G02B 6/0045; G06F 3/0338
See application file for complete search history.

(56) References Cited

U.S. PATENT DOCUMENTS

| 5,532,476 A | 7/1996 | Mikan |
| 7,474,296 B2 | 1/2009 | Obermeyer et al. |
| (Continued) | | |

FOREIGN PATENT DOCUMENTS

| CN | 101607134 B | 5/2011 |
| CN | 208115139 U | 11/2018 |
| (Continued) | | |

OTHER PUBLICATIONS

Written Opinion issued for International Patent Application No. PCT/SG2021/050064 (3 pages).

(Continued)

*Primary Examiner* — Yingchuan Zhang
(74) *Attorney, Agent, or Firm* — Polsinelli PC

(57) ABSTRACT

A control stick including a stick assembly including: an outer tube-like opaque wall; an annular light guide structure disposed inside the outer tube-like opaque wall in a concentric manner wherein an annular end surface of the annular light guide structure is flushed with a first end of the outer tube-like opaque wall; and an elongated central axial member fitted inside the annular light guide structure and held by the annular light guide structure. A first axial end of the elongated central axial member is directed in a same first direction as the first end of the outer tube-like opaque wall. A second axial end of the elongated central axial member includes a control-engagement-element for engaging with a control stick mechanism. The control stick further including at least one light source disposed to transmit light to the annular light guide structure which is directed to the annular end surface thereof.

20 Claims, 7 Drawing Sheets

(56) References Cited

U.S. PATENT DOCUMENTS

| | | | |
|---|---|---|---|
| 8,122,783 | B2 | 2/2012 | Olson et al. |
| 10,279,246 | B2 | 5/2019 | Sakamoto et al. |
| 10,561,937 | B2 | 2/2020 | Strahle et al. |
| 2005/0039562 | A1 | 2/2005 | Kako et al. |
| 2006/0028437 | A1 | 2/2006 | Armstrong |
| 2008/0018600 | A1 | 1/2008 | Hou et al. |
| 2008/0280681 | A1 | 11/2008 | Kidakarn |
| 2009/0054146 | A1 | 2/2009 | Epstein et al. |
| 2009/0318227 | A1 | 12/2009 | Nakajima |

FOREIGN PATENT DOCUMENTS

| | | |
|---|---|---|
| CN | 209828242 U | 12/2019 |
| KR | 200320700 Y1 | 7/2003 |
| KR | 20050121105 A | 12/2005 |
| KR | 20200045626 A | 5/2020 |

OTHER PUBLICATIONS

How to install LED light thumbsticks to Xbox One controller? (https://www.youtube.com/watch?v=x5B-1rFPKM4) (3 pages).

CONTROL STICK

TECHNICAL FIELD

Various embodiments generally relate to a control stick. In particular, various embodiments generally relate to a control stick for a gaming controller.

BACKGROUND

Traditionally, gaming controller are configured functionally to serve as an input device for gaming applications. The gaming controller has evolved to include various kinds of buttons and interface for facilitating the gamers to interact with the gaming applications. With the advancement in the gaming industry, mere functional gaming controller can no longer meet the needs of the gamers as the gamers seek to elevate the gaming experience and expect the gaming controller to function more than mere input device. Enhanced gaming experience via stimulating sense of touch by haptic mechanism has been developed in the past few years. However, sense of touch is only one of the five senses. Thus, the gamers are expecting more to be done.

Accordingly, there is a need further enhance the sensory experience of gaming controller to address the above issues.

SUMMARY

According to various embodiments, there is provided a control stick including a stick assembly. The stick assembly including an outer tube-like opaque wall having a central axis extending between a first end and a second end, the outer tube-like opaque wall having an exterior wall surface and an interior wall surface. The stick assembly including an annular light guide structure disposed inside the outer tube-like opaque wall in a concentric manner so as to be lined against the interior wall surface of the outer tube-like opaque wall, wherein an annular end surface of the annular light guide structure is flushed with the first end of the outer tube-like opaque wall. The stick assembly including an elongated central axial member fitted inside the annular light guide structure and held by the annular light guide structure in an orientation longitudinally aligned with the central axis of the outer tube-like opaque wall, wherein a first axial end of the elongated central axial member is directed in a same first direction as the first end of the outer tube-like opaque wall and a second axial end of the elongated central axial member is directed in a same second direction as the second end of the outer tube-like opaque wall, wherein the second axial end of the elongated central axial member includes a control-engagement-element for engaging with a control stick mechanism. The control stick further including at least one light source disposed to transmit light to the annular light guide structure in a manner such that the annular light guide structure directs the light to the annular end surface of the annular light guide structure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
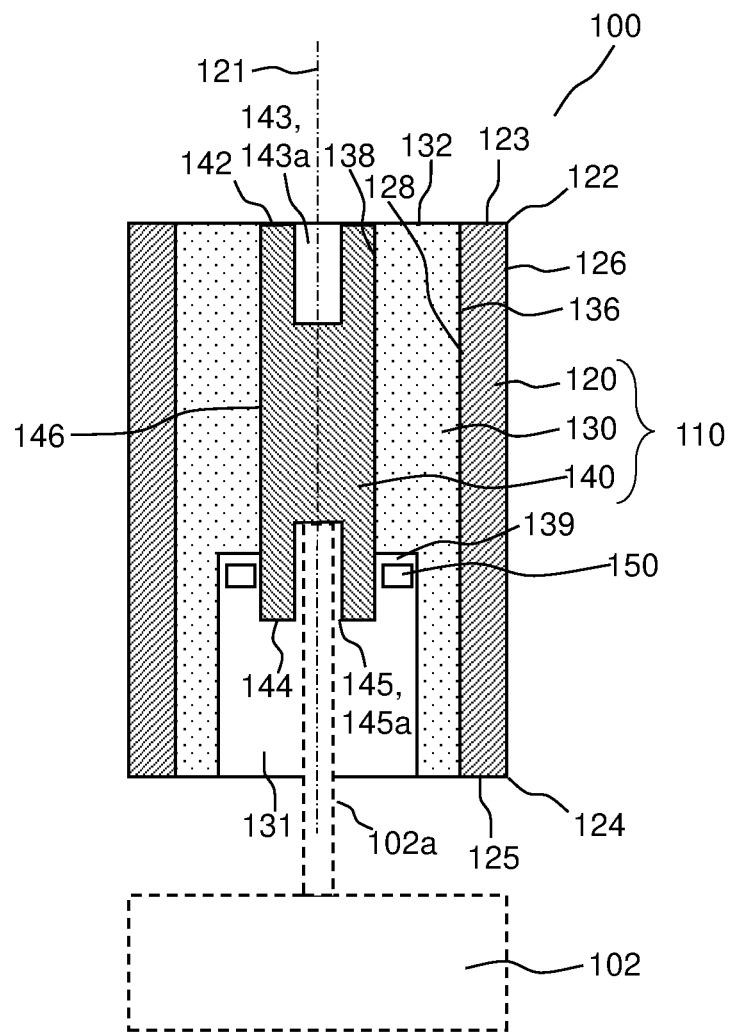
FIG. 1A shows a schematic diagram illustrating a longitudinal section of a control stick according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a control stick. In particular, various embodiments generally relate to a control stick for a gaming controller. According to various embodiments, the control stick may include a thumbstick, an analogue stick, a joystick, a control column, a center stick, or any suitable pivotable lever control for two dimensional input along a X-axis and a Y-axis. According to various embodiments, the control stick may be provided to a controller or a gaming controller for providing two dimensional directions or movements inputs.

According to various embodiments, the control stick may be configured to provide lighting effect which can be distinctly distinguishable from the conventional controller. According to various embodiments, in addition to being aesthetically different from conventional controller, the lighting effect may enhance the gaming experience by additionally stimulating the user visually. According to various embodiments, the control stick may be configured to display light behaviour such as breathing light, spectrum cycling (different color cycle) etc. According to various embodiments, the control stick may also be integrated with the game situation to give further excitement to the game and bundle with other controller features (like haptic feedback or vibrator) to further enhance the sensory experience of the user when using the gaming controller with the control stick of the various embodiments.

Various embodiments seek to provide a controller or a gaming controller with a control stick (e.g. a thumbstick, an analogue stick, or a joystick) having lighting effects. According to various embodiments, the lighting effects may be a red, green, blue (RGB) lighting effects. According to various embodiments, the control stick may include a removable control-stick-cap (e.g. a joystick cap) and a stick assembly (or a stick or shaft). When coupled together, the stick assembly may be extending from a bottom of the control-stick-cap along a central axis. The stick assembly may include an annular or circular light guide surrounding the central axis. According to various embodiments, the control stick may include at least one light source (or light emitting diode) or a plurality of light sources (or light emitting diodes) configured to emit light into the annular or circular light guide. The at least one light source (or light emitting diode) or the plurality of light sources (or light emitting diodes) may be mounted to a circuit board (e.g. a printed circuit board). According to various embodiments, the light emitted by the at least one light source (or light emitting diode) or the plurality of light sources (or light emitting diodes) may pass through the annular or circular light guide of the stick assembly into a region of light diffusing material in the control-stick-cap so as to illuminate said region. According to various embodiments, the annular or circular light guide of the stick assembly may be made of polycarbonate. According to various embodiments, the region of light diffusing material in the control-stick-cap may be made of polycarbonate with white powder.

According to various embodiments, the control-stick-cap may be removably secured to the stick assembly. According to various embodiments, the control-stick-cap may be removably secured to the stick assembly via various removable locking arrangement including, but not limited to, magnetic locking arrangement, tongue and groove locking arrangement, pin and hole locking arrangement, snap fit interlocking arrangement, or twist and lock interlocking arrangement. According to various embodiments, when the control-stick-cap is removably secured to the stick assembly via magnetic locking arrangement, the stick assembly may include a magnet and the control-stick-cap may include magnetic materials or vice versa. According to various embodiments, when the stick assembly includes the magnet, the stick assembly may include a retaining member (e.g. a stopper plate) to retain the magnet within the stick assembly. According to various embodiments, the retaining member may be fixedly coupled to the circuit board having the at least one light source (or light emitting diode) or the plurality of light sources (or light emitting diodes) such that the magnet is held between the retaining member and the circuit board. According to various embodiments, the retaining member may include pins or legs extending perpendicularly from a plate portion of the retaining member such that the ends of the pins or legs may be fixedly coupled (e.g. heatstaked) to the circuit board so as to stabilize the retaining member to the circuit board. Accordingly, the magnet may be between the plate portion of the retaining member and the circuit board and may be loosely abutting the plate portion of the retaining member. According to various embodiments, when the control-stick-cap is coupled to the stick assembly, a top surface of the plate portion of the retaining member may be abutting the control-stick-cap and a bottom surface of the plate portion of the retaining member may be abutting the magnet. According to various embodiments, the plate portion of the retaining member may include a through hole whereby a protrusion from underneath the control-stick-cap may be inserted therethrough when the control-stick-cap is coupled to the stick assembly. According to various embodiments, the stick assembly may include a recessed portion (or a socket) extending along the central axis such that the protrusion from underneath the control-stick-cap may be inserted the plate portion of the retaining member into the recessed portion of the stick assembly.

According to various embodiments, the stick assembly may include a cylindrical portion and a dome-like portion (or dome structure). According to various embodiments, the cylindrical portion may be extending upright from an apex of the dome-like portion. According to various embodiments, an interior of the stick assembly may include a ledge to hold the circuit board having the at least one light source (or light emitting diode) or the plurality of light sources (or light emitting diodes). Accordingly, the circuit board may be coupled to the ledge along the interior of the stick assembly. According to various embodiments, the ledge may be an annular or circular ledge (or platform) surrounding the central axis at a transition between the cylindrical portion and the dome-like portion. According to various embodiments, the stick assembly may include at least one connector (e.g. contact spring) or a plurality of connectors to electrically connect the circuit board with a main circuit board of the controller. According to various embodiments, the main circuit board may be at or below a base (or bottom) of the dome-like portion.

The following examples pertain to various embodiments.

Example 1 is a control stick including:
a stick assembly including
an outer tube-like opaque wall having a central axis extending between a first end and a second end, the outer tube-like opaque wall having an exterior wall surface and an interior wall surface,
an annular light guide structure disposed inside the outer tube-like opaque wall in a concentric manner so as to be lined against the interior wall surface of the outer tube-like opaque wall, wherein an annular end surface of the annular light guide structure is flushed with the first end of the outer tube-like opaque wall, and
an elongated central axial member fitted inside the annular light guide structure and held by the annular light guide structure in an orientation longitudinally aligned with the central axis of the outer tube-like opaque wall, wherein a first axial end of the elongated central axial member is directed in a same first direction as the first end of the outer tube-like opaque wall and a second axial end of the elongated central axial member is directed in a same second direction as the second end of the outer tube-like opaque wall, wherein the second axial end of the elongated central axial member includes a control-engagement-element for engaging with a control stick mechanism; and at least one light source disposed to transmit light to the annular light guide structure in a manner such that the annular light guide structure directs the light to the annular end surface of the annular light guide structure.

In Example 2, the subject matter of Example 1 may optionally include that the annular light guide structure may be fixedly attached to the outer tube-like opaque wall, and the elongated central axial member may be fixedly attached to the annular light guide structure.

In Example 3, the subject matter of Example 1 or 2 may optionally include that the at least one light source may be coupled to the annular light guide structure in a manner so as to transmit light into the annular light guide structure in a direction towards the annular end surface of the annular light guide structure.

In Example 4, the subject matter of any one of Examples 1 to 3 may optionally include that the annular light guide structure may include a ledge along an inner wall surface of the annular light guide structure.

In Example 5, the subject matter of Example 4 may optionally include that the ledge may be an annular ledge.

In Example 6, the subject matter of Example 4 or 5 may optionally include that the at least one light source may be coupled to the ledge of the annular light guide structure and operable to transmit the light into the annular light guide structure such that the light is directed by the annular light guide structure to the annular end surface of the annular light guide structure.

In Example 7, the subject matter of any one of Examples 1 to 6 may optionally include a control-stick-cap coupled to the stick assembly, wherein the first axial end of the elongated central axial member of the stick assembly includes a cap-engagement-element for engaging with the control-stick-cap, wherein the control-stick-cap includes a plate-like structure having a primary surface and an underneath surface opposite the primary surface;

a light permeable ring embedded in the plate-like structure in a manner such that a first annular surface of the light permeable ring is exposed through the primary surface of the plate-like structure and a second annular surface of the light permeable ring is exposed through the underneath surface of the plate-like structure, wherein the first annular surface and the second annular surface are opposite surfaces of the light permeable ring; and a stick-engagement-element disposed at a position of the underneath surface of the plate-like structure corresponding to a centre of the second annular surface of the light permeable ring, wherein the stick-engagement-element of the control-stick-cap is in engagement with the cap-engagement-element of the stick assembly, wherein the second annular surface of the light permeable ring is abutting the annular end surface of the annular light guide structure.

In Example 8, the subject matter of Example 7 may optionally include that an outer periphery portion of the second annular surface of the light permeable ring remains exposed and non-covered by the stick assembly.

In Example 9, the subject matter of any one of Examples 1 to 6 may optionally include a control-stick-cap coupled to the stick assembly, wherein the first axial end of the elongated central axial member of the stick assembly directed includes a cap-engagement-element for engaging with the control-stick-cap, wherein the control-stick-cap includes a cap body including a plate-like portion having a primary surface and an underneath surface opposite the primary surface and a stem portion extending from the underneath surface of the plate-like portion;

a light permeable annular structure embedded in the cap body in a manner such that a first annular surface of the light permeable annular structure is exposed through the primary surface of the plate-like portion and a second annular surface of the light permeable annular structure is exposed through a base surface of the stem portion, wherein the first annular surface and the second annular surface are opposite end surfaces of the light permeable annular structure; and a stick-engagement-element disposed at a position corresponding to a centre of the second annular surface of the light permeable ring, wherein the stick-engagement-element of the control-stick-cap is in engagement with the cap-engagement-element of the stick assembly, wherein the second annular surface of the light permeable ring is abutting the annular end surface of the annular light guide structure.

In Example 10, the subject matter of Example 9 may optionally include that the light permeable annular structure may include a ring portion in the plate-like portion of the cap body; and a hollow cylindrical portion in the stem portion of the cap body, wherein an outer diameter of the ring portion of the light permeable annular structure at a transition between the plate-like portion and the stem portion of the cap body is larger than an outer diameter of the hollow cylindrical portion of the light permeable annular structure at the transition between the plate-like portion and the stem portion of the cap body so as to form an overhang annular surface exposed through the underneath surface of the plate-like portion of the cap body and surrounding the stem portion of the cap body.

In Example 11, the subject matter of any one of Examples 7 to 10 may optionally include that the cap-engagement-element of the stick assembly and the stick-engagement-element of the control-stick-cap may be removably couplable to each other.

In Example 12, the subject matter of any one of Examples 7 to 11 may optionally include that the stick assembly may further include a locking element disposed at a cap end portion of the outer tube-like opaque wall to lock the control-stick-cap to the stick assembly.

In Example 13, the subject matter of Example 12 may optionally include that the locking element may include a magnet and at least a portion of the control-stick-cap abutting the stick assembly may be made of magnetic material.

In Example 14, the subject matter of Example 13 may optionally include that the stick assembly may further include a retaining member to retain the magnet within the stick assembly.

In Example 15, the subject matter of Example 14 may optionally include that the retaining member may be fixedly attached to a circuit board having the at least one light source so as to cooperatively retain the magnet within the stick assembly.

In Example 16, the subject matter of Example 12 may optionally include that the control-stick-cap may include a corresponding locking element disposed at a portion of the control-stick-cap corresponding to the locking element of the stick assembly so as to engage with the locking element of the stick assembly to lock the control-stick-cap to the stick assembly.

In Example 17, the subject matter of any one of Examples 1 to 16 may optionally include that the annular light guide structure of the stick assembly may extend from the first end to the second end of the outer tube-like opaque wall so as to line the interior wall surface of the outer tube-like opaque wall.

In Example 18, the subject matter of any one of Examples 1 to 17 may optionally include that the outer tube-like opaque wall of the stick assembly may include a cylindrical portion extending from the first end followed by a dome-like portion with a base of the dome-like portion being the second end of the outer tube-like opaque wall.

In Example 19, the subject matter of Example 18 in combination with Example 17 may optionally include that the annular light guide structure of the stick assembly may include a corresponding cylindrical portion extending from the first end of the outer tube-like opaque wall followed by a corresponding dome-like portion with a base of the dome-like portion terminating at the second end of the outer tube-like opaque wall, wherein the at least one light source may be disposed at a transition between the corresponding cylindrical portion and the corresponding dome-like portion of the annular light guide structure.

In Example 20, the subject matter of any one of Examples 1 to 19 may optionally include at least one connector in electrical connection with the at least one light source wherein an end of the at least one connector may be exposed from the second end of the outer tube-like opaque wall.

Example 21 is a control stick including:
a stick assembly including
an outer tube-like opaque wall having a central axis extending between a first end and a second end, the outer tube-like opaque wall having an exterior wall surface and an interior wall surface,
an annular light guide structure disposed inside the outer tube-like opaque wall in a concentric manner so as to be lined against the interior wall surface of the outer tube-like opaque wall, wherein an annular end surface of the annular light guide structure is flushed with the first end of the outer tube-like opaque wall, and
an elongated central axial member fitted inside the annular light guide structure and held by the annular light guide structure in an orientation longitudinally aligned with the central axis of the outer tube-like opaque wall;
a control-stick-cap coupled to the stick assembly, the control-stick-cap including
a cap body, and
a light permeable annular structure embedded in the cap body in a manner such that a first annular surface of the light permeable annular structure and a second annular surface of the light permeable annular structure are exposed through opposite surfaces of the cap body, wherein the first annular surface and the second annular surface are opposite end surfaces of the light permeable annular structure,
wherein the cap body is in engagement with the central axial member of the stick assembly,
wherein the second annular surface of the light permeable annular structure of the control-stick-cap is abutting the annular end surface of the annular light guide structure of the stick assembly; and
at least one light source disposed to transmit light to the annular light guide structure in a manner such that the annular light guide structure directs the light to the annular end surface of the annular light guide structure so as to illuminate the light permeable annular structure of the control-stick-cap.

In Example 22, the subject matter of Example 21 may optionally include that the annular light guide structure may be fixedly attached to the outer tube-like opaque wall, and the elongated central axial member may be fixedly attached to the annular light guide structure.

In Example 23, the subject matter of Example 21 or 22 may optionally include that the at least one light source may be coupled to the annular light guide structure in a manner so as to transmit light into the annular light guide structure in a direction towards the annular end surface of the annular light guide structure.

In Example 24, the subject matter of any one of Examples 21 to 23 may optionally include that the annular light guide structure may include a ledge along an inner wall surface of the annular light guide structure.

In Example 25, the subject matter of Example 24 may optionally include that the ledge may be an annular ledge.

In Example 26, the subject matter of Example 24 or 25 may optionally include that the at least one light source may be coupled to the ledge of the annular light guide structure and operable to transmit the light into the annular light guide structure such that the light may be directed by the annular light guide structure to the annular end surface of the annular light guide structure.

In Example 27, the subject matter of any one of Examples 21 to 26 may optionally include that the annular light guide structure of the stick assembly may extend from the first end to the second end of the outer tube-like opaque wall so as to be lined against the interior wall surface of the outer tube-like opaque wall.

In Example 28, the subject matter of any one of Examples 21 to 27 may optionally include that the outer tube-like opaque wall of the stick assembly may include a cylindrical portion extending from the first end followed by a dome-like portion with a base of the dome-like portion being the second end of the outer tube-like opaque wall.

In Example 29, the subject matter of Example 28 in combination with Example 27 may optionally include that the annular light guide structure of the stick assembly may include a corresponding cylindrical portion extending from the first end of the outer tube-like opaque wall followed by a corresponding dome-like portion with a base of the dome-like portion terminating at the second end of the outer tube-like opaque wall, wherein the at least one light source may be disposed at a transition between the corresponding cylindrical portion and the corresponding dome-like portion of the annular light guide structure.

In Example 30, the subject matter of any one of Examples 21 to 29 may optionally include at least one connector in electrical connection with the at least one light source wherein an end of the at least one connector may be exposed from the second end of the outer tube-like opaque wall.

Example 31 is a control stick including:
a stick assembly including
an outer tube-like opaque wall having a central axis extending between a first end and a second end, the outer tube-like opaque wall having an exterior wall surface and an interior wall surface,
an annular light guide structure disposed inside the outer tube-like opaque wall in a concentric manner so as to be lined against the interior wall surface of the outer tube-like opaque wall, wherein an annular end surface of the annular light guide structure is flushed with the first end of the outer tube-like opaque wall, and
an elongated central axial member fitted inside the annular light guide structure and held by the annular light guide structure in an orientation longitudinally aligned with the central axis of the outer tube-like opaque wall, wherein a first axial end of the elongated central axial member directed in a same first direction as the first end of the outer tube-like opaque wall includes a cap-engagement-element and a second axial end of the elongated central axial member directed in a same second direction as the second end of the outer tube-like opaque wall includes a control-engagement-element;
a control-stick-cap removably coupled to the stick assembly, the control-stick-cap including
a cap body,
a light permeable annular structure embedded in the cap body in a manner such that a first annular surface of the light permeable annular structure and a second annular surface of the light permeable annular structure are exposed through opposite surfaces of the cap body, wherein the first annular surface and the second annular surface are opposite surfaces of the light permeable annular structure, and
a stick-engagement-element disposed at a position corresponding to a centre of the second annular surface of the light permeable ring,
wherein the stick-engagement-element of the control-stick-cap is removably coupled to the cap-engagement-element of the stick assembly.
wherein the second annular surface of the light permeable annular structure of the control-stick-cap is abutting the annular end surface of the annular light guide structure of the stick assembly when the control-stick-cap and the stick assembly are coupled together; and
at least one light source disposed to transmit light to the annular light guide structure in a manner such that the annular light guide structure directs the light to the annular end surface of the annular light guide structure so as to illuminate the light permeable annular structure of the control-stick-cap.

In Example 32, the subject matter of Example 31 may optionally include a locking element disposed at a cap end portion of the outer tube-like opaque wall to lock the control-stick-cap to the stick assembly.

In Example 33, the subject matter of Example 32 may optionally include that the locking element may include a magnet and at least a portion of the control-stick-cap abutting the stick assembly may be made of magnetic material.

In Example 34, the subject matter of Example 33 may optionally include a retaining member to retain the magnet within the stick assembly.

In Example 35, the subject matter of Example 34 may optionally include that the retaining member may be fixedly attached to a circuit board having the at least one light source so as to cooperatively retain the magnet within the stick assembly.

In Example 36, the subject matter of Example 32 may optionally include that the control-stick-cap may include a corresponding locking element disposed at a portion of the control-stick-cap corresponding to the locking element of the stick assembly so as to engage with the locking element of the stick assembly to lock the control-stick-cap to the stick assembly.

In Example 37, the subject matter of any one of Examples 31 to 36 may optionally include that the stick-engagement-element of the control-stick-cap may include a protrusion and the cap-engagement-element of the stick assembly may include a corresponding recess.

Figure 1B:
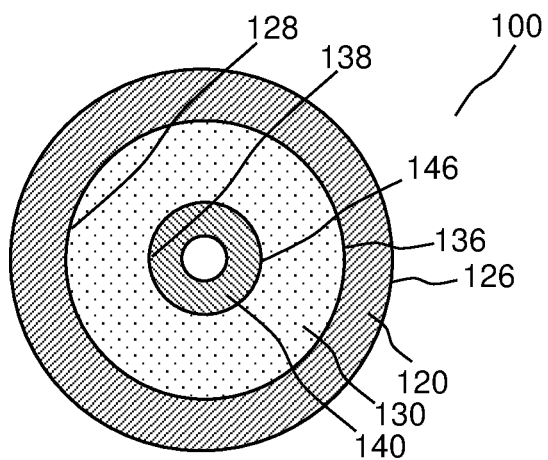
FIG. 1B shows a schematic diagram illustrating a top view of the control stick of FIG. 1A according to various embodiments.

FIG. 1A shows a schematic diagram illustrating a longitudinal section of a control stick 100 according to various embodiments. FIG. 1B shows a schematic diagram illustrating a top view of the control stick 100 according to various embodiments. According to various embodiments, the control stick 100 may include a thumbstick, an analogue stick, a joystick, a control column, a center stick, or any suitable pivotable lever control for two dimensional directions or movements inputs. According to various embodiments, the control stick 100 may include a stick assembly 110. According to various embodiments, the stick assembly 110 may include an outer tube-like opaque wall 120. Accordingly, the outer tube-like opaque wall 120 may be a hollow elongated structure made of non-transparent and non-translucent material impenetrable by light. According to various embodiments, the stick assembly 110 may be embodied by the outer tube-like opaque wall 120. Accordingly, the outer tube-like opaque wall 120 may give a concrete or physical exterior form or shape to the stick assembly 110. According to various embodiments, the outer tube-like opaque wall 120 may have a central axis 121 extending between a first end 122 and a second end 124. Accordingly, the central axis 121 may be extending longitudinally along the outer tube-like opaque wall 120 from the first end 122 to the second end 124. According to various embodiments, the central axis 121 of the outer tube-like opaque wall 120 may be its longitudinal axis. According to various embodiments, the outer tube-like opaque wall 120 may have an exterior wall surface 126 and an interior wall surface 128. Accordingly, the exterior wall surface 126 may serve as an exterior surface of the stick assembly 110. According to various embodiments, the first end 122 of the outer tube-like opaque wall 120 may include a first rim 123 surrounding an opening at the first end 122 of the outer tube-like opaque wall 120. According to various embodiments, the second end 124 of the outer tube-like opaque wall 120 may include a second rim 125 surrounding an opening at the second end 124 of the outer tube-like opaque wall 120.

According to various embodiments, the stick assembly 110 may include an annular light guide structure 130. The annular light guide structure 130 may have a tube-like shape surrounding an inner hollow channel 131 whereby the annular light guide structure 130 may have an annular shaped cross-section. According to various embodiments, the annular light guide structure 130 may be made of transparent material capable of transmitting light. According to various embodiments, the annular light guide structure 130 may be disposed inside the outer tube-like opaque wall 120 in a concentric manner. Accordingly, the annular light guide structure 130 and the outer tube-like opaque wall 120 may be coaxial and the outer tube-like opaque wall 120 may surround or encircle the annular light guide structure 130. According to various embodiments, the annular light guide structure 130 may be lined against the interior wall surface 128 of the outer tube-like opaque wall 120. Accordingly, the annular light guide structure 130 may be disposed inside the outer tube-like opaque wall 120 in a manner so as to cover or place upon the interior wall surface 128 of the outer tube-like opaque wall 120. Hence an external wall surface 136 of the annular light guide structure 130 may be lined against the interior wall surface 128 of the outer tube-like opaque wall 120. According to various embodiments, an annular end surface 132 the annular light guide structure 130 may be flushed with the first end 122 of the outer tube-like opaque wall 120. Accordingly, the annular end surface 132 the annular light guide structure 130 may be levelled with the first rim 123 at the first end 122 of the outer tube-like opaque wall 120 such that the annular end surface 132 the annular light guide structure 130 and the first rim 123 of the outer tube-like opaque wall 120 may be in a same plane. Hence, the annular end surface 132 of the annular light guide structure 130 and the first end 122 of the outer tube-like opaque wall 120 may be aligned in a transverse direction with respect to the central axis 121 of the outer tube-like opaque wall 120. According to various embodiments, the annular end surface 132 of the annular light guide structure 130 and the first rim 123 of the outer tube-like opaque wall 120 may be contiguous so as to be physically adjacent and touching.

According to various embodiments, the stick assembly 110 may include an elongated central axial member 140. According to various embodiments, the elongated central axial member 140 may be fitted inside the annular light guide structure 130. Accordingly, the elongated central axial member 140 may be put or provided or inserted in the inner hollow channel 131 of the annular light guide structure 130. According to various embodiments, the elongated central axial member 140 may be held by the annular light guide structure 130 so as to be retained within the inner hollow channel 131 of the annular light guide structure 130. Accordingly, the elongated central axial member 140 may be coupled or attached or fixed to the annular light guide structure 130. The elongated central axial member 140 may be contained or kept in the annular light guide structure 130. According to various embodiments, an internal wall 138 of the annular light guide structure 130 may be configured to hold the elongated central axial member 140. According to various embodiments, the elongated central axial member 140 may be in an orientation longitudinally aligned with the central axis 121 of the outer tube-like opaque wall 120. Accordingly, the elongated central axial member 140 may be coaxial with the outer tube-like opaque wall 120 as well as the annular light guide structure 130. Hence, the elongated central axial member 140, the annular light guide structure 130, and the outer tube-like opaque wall 120 may be in a concentric arrangement with respect to each other such that the elongated central axial member 140 may be in the centre with the annular light guide structure 130 surrounding the elongated central axial member 140 and with the outer tube-like opaque wall 120 surrounding the annular light guide structure 130.

According to various embodiments, the elongated central axial member 140 may include a first axial end 142 and a second axial end 144. According to various embodiments, with the elongated central axial member 140 longitudinally aligned to the central axis 121 of the outer tube-like opaque wall 120, the first axial end 142 of the elongated central axial member 140 may be directed in a same first direction as the first end 122 of the outer tube-like opaque wall 120 and the second axial end 144 of the elongated central axial member 140 may be directed in a same second direction as the second end 124 of the outer tube-like opaque wall 120. Accordingly, the first axial end 142 of the elongated central axial member 140 and the first end 122 of the outer tube-like opaque wall 120 may be pointing in the same first direction, and the second axial end 144 of the elongated central axial member 140 and the second end 124 of the outer tube-like opaque wall 120 may be pointing in the same second direction. According to various embodiments, the first axial end 142 of the elongated central axial member 140 may be levelled with the first end 122 of the outer tube-like opaque wall 120 so as to lie in the same plane as the first end 122 of the outer tube-like opaque wall 120. Accordingly, the first axial end 142 of the elongated central axial member 140 and the first end 122 of the outer tube-like opaque wall 120 may be aligned in the transverse direction with respect to the central axis 121 of the outer tube-like opaque wall 120.

According to various embodiments, the second axial end 144 of the elongated central axial member 140 may include a control-engagement-element 145 for engaging with a control stick mechanism 102. According to various embodiments, the control stick mechanism 102 may be configured to convert the movement of the control stick 100 into electrical signals. Accordingly, the control-engagement-element 145 of the elongated central axial member 140 may serve to couple the control stick 100 to the control stick mechanism 102 such that the control stick mechanism 102 may detect the movement of the control stick 100 for converting the motions into electrical signals. According to various embodiments, the control-engagement-element 145 of the elongated central axial member 140 may include a hole 145a extending longitudinally from the second axial end 144 of the elongated central axial member 140. Accordingly, the hole 145a may be fitted over an input-stick 102a of the control stick mechanism 102. Hence, the input-stick 102a of the control stick mechanism 102 may be inserted into the hole 145a at the second axial end 144 of the elongated central axial member 140.

According to various embodiments, the annular light guide structure 130 may be fixedly attached to the outer tube-like opaque wall 120. According to various embodiments, the external wall surface 136 of the annular light guide structure 130 may be fixedly attached to the interior wall surface 128 of the outer tube-like opaque wall 120. According to various embodiments, the annular light guide structure 130 and the outer tube-like opaque wall 120 may be fixedly attached together via various joining methods including, but not limited to, adhesive, bonding, mechanical fasteners, interference fittings, interlocking joints, etc. According to various embodiments, the elongated central axial member 140 may be fixedly attached to the annular light guide structure 130. According to various embodiments, an outer wall surface 146 of the elongated central axial member 140 may be fixedly attached to the internal wall surface 138 of the annular light guide structure 130. According to various embodiments, the elongated central axial member 140 and the annular light guide structure 130 may be fixedly attached together via various joining methods including, but not limited to, adhesive, bonding, mechanical fasteners, interference fittings, interlocking joints, etc.

According to various embodiments, the control stick 100 may include at least one light source 150. According to various embodiments, the at least one light source 150 may be disposed to transmit light to the annular light guide structure 130 in a manner such that the annular light guide structure 130 may direct the light to the annular end surface 132 of the annular light guide structure 130, which is flushed with the first end 122 of the outer tube-like opaque wall 120. Accordingly, the at least one light source 150 may be positioned and oriented such that the light transmitted into the annular light guide structure 130 may be transported along the annular light guide structure 130 towards the annular end surface 132 of the annular light guide structure 130. According to various embodiments, the control stick 100 may include one or more light sources 150 or a plurality of light sources 150. Accordingly, each of the light source 150 may be disposed in a manner such that light transmitted to the annular light guide structure 130 may be directed or guided to the annular end surface 132 of the annular light guide structure 130. According to various embodiments, the at least one light source 150 or the one or more light sources 150 or the plurality of light sources 150 may be disposed within the stick assembly 110 or outside the stick assembly 110.

According to various embodiments, the at least one light source 150 or each light source 150 may be coupled to the annular light guide structure 130 in a manner so as to transmit light into the annular light guide structure 130 in a direction towards the annular end surface 132 of the annular light guide structure 130. Accordingly, the at least one light source 150 or each light source 150 may be coupled to the annular light guide structure 130 in a position and orientation whereby the light projected by the at least one light source 150 or each light source 150 may be towards the annular end surface 132 of the annular light guide structure 130. Hence, a beam angle of the at least one light source 150 or each light source 150 may be directed in the direction towards the annular end surface 132 of the annular light guide structure 130.

According to various embodiments, the annular light guide structure 130 may include a ledge 139 along the inner wall surface 138 of the annular light guide structure 130. The ledge 139 of the annular light guide structure 130 may be perpendicular to the central axis 121 of the outer tube-like opaque wall 120. According to various embodiments, the ledge 139 may form a step profile along the inner wall surface 138 of the annular light guide structure 130. According to various embodiments, the ledge 139 may be directed away from the annular end surface 132 of the annular light guide structure 130 such that the ledge 139 and the annular end surface 132 are facing opposite directions. According to various embodiments, the ledge 139 may include an annular ledge. Accordingly, the ledge 139 may extend along an inner circumference of the inner wall surface 138 of the annular light guide structure 130 in a continuous loop to form the annular ledge.

According to various embodiments, the at least one light source 150 or each light source 150 may be coupled to the ledge 139 of the annular light guide structure 130 and operable to transmit the light into the annular light guide structure 130 such that the light may be directed by the annular light guide structure 130 to the annular end surface 132 of the annular light guide structure 130. According to various embodiments, the at least one light source 150 or each light source 150 may be coupled to the ledge 139 of the annular light guide structure 130 in a manner such that the light may be transmitted into the annular light guide structure 130 through the ledge 139 of the annular light guide structure 130. Accordingly, the at least one light source 150 or each light source 150 may be coupled facing the ledge 139 of the annular light guide structure 130.

Figure 1C:
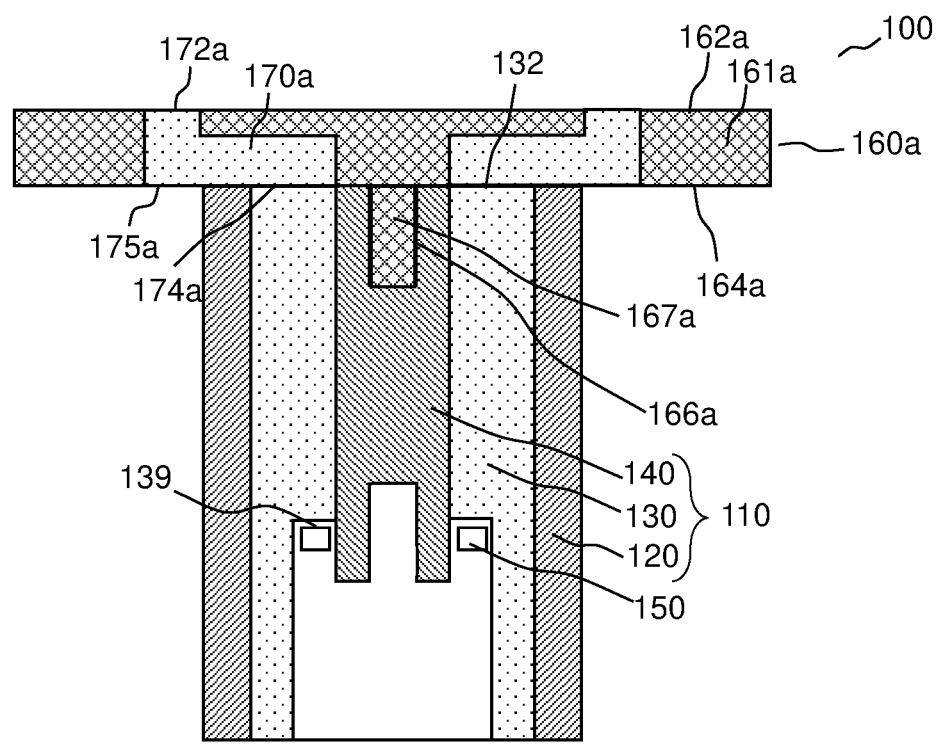
FIG. 1C shows a further details of the control stick of FIG. 1A with a first type of control-stick-cap coupled to a stick assembly according to various embodiments.
Figure 1D:
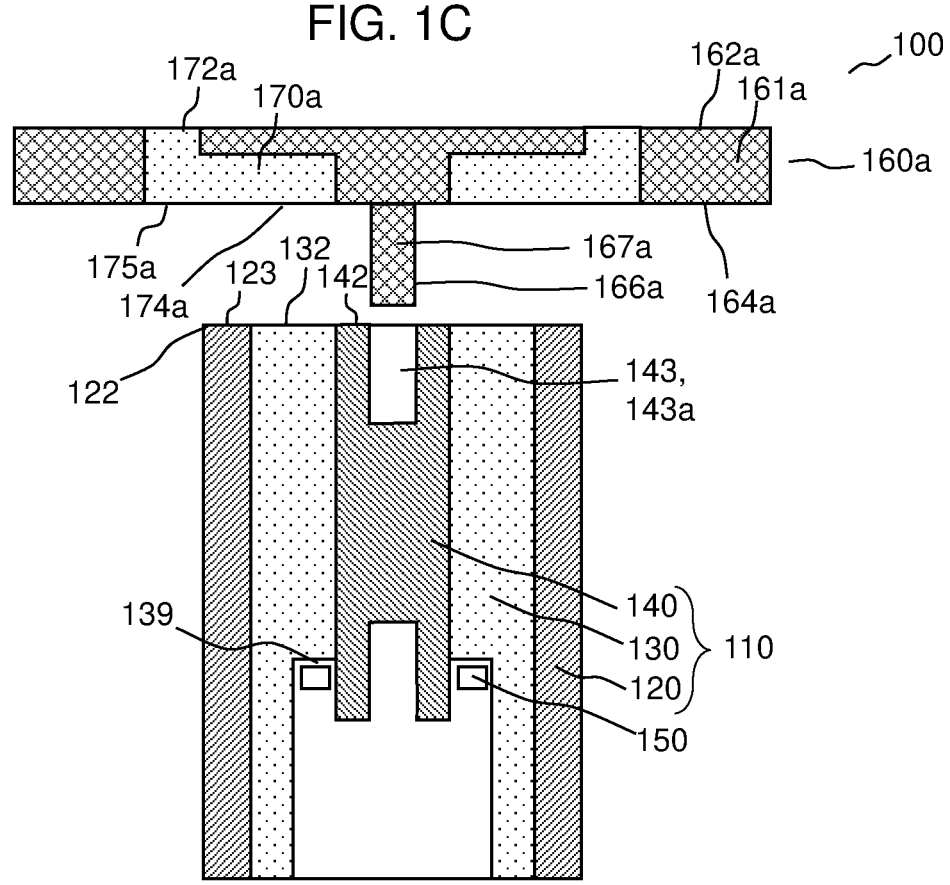
FIG. 1D shows the control-stick-cap of FIG. 1C being separated from the stick assembly according to various embodiments.

FIG. 1C shows a further details of the control stick 100 of FIG. 1A with a first type of control-stick-cap 160a coupled to the stick assembly 110 according to various embodiments. FIG. 1D shows the control-stick-cap 160a of FIG. 1C being separated from the stick assembly 110 according to various embodiments. According to various embodiments, the control stick 100 may include the control-stick-cap 160a. According to various embodiments, the control-stick-cap 160a and the stick assembly 110 may be removably couplable to each other. Accordingly, the control-stick-cap 160a may be coupled to the stick assembly 110 in a manner so as to be removable.

According to various embodiments, the control-stick-cap 160a may include a plate-like structure 161a. The plate-like structure 161a may be a cap body of the control-stick-cap 160a. According to various embodiments, the plate-like structure 161a may be of a circular shape or a disc shape. According to various embodiments, the plate-like structure 161a may have a primary surface 162a and an underneath surface 164a. The underneath surface 164a may be opposite the primary surface 162a. Accordingly, the primary surface 162a and the underneath surface 164a may be two opposite broad surfaces of the plate-like structure 161a.

According to various embodiments, the control-stick-cap 160a may include a light permeable ring 170a (or a light permeable annular structure) embedded in the plate-like structure 161a. According to various embodiments, the light permeable ring 170a may include a first annular surface 172a exposed through the primary surface 162a of the plate-like structure 161a and a second annular surface 174a exposed through the underneath surface 164a of the plate-like structure 161a. The first annular surface 172a of the light permeable ring 170a and the second annular surface 174a of the light permeable ring 170a may be opposite surfaces of the light permeable ring 170a. Accordingly, the light permeable ring 170a may be set in or fixed into the plate-like structure 161a such that the first annular surface 172a and the second annular surface 174a may be respectively exposed through the primary surface 162a and the underneath surface 164a of the plate-like structure 161a. Hence, the first annular surface 172a and the second annular surface 174a may be exposed through opposite surfaces of the plate-like structure 161a (or the cap body). According to various embodiments, only the first annular surface 172a and the second annular surface 174a of the light permeable ring 170a may be exposed, and the remaining surfaces of the light permeable ring 170a may be concealed or covered or surrounded or enclosed by the plate-like structure 161a. According to various embodiments, the light permeable ring 170a may be made of light diffusing material such that light may be distributed evenly throughout the light permeable ring 170a.

According to various embodiments, when the control-stick-cap 160a and the stick assembly 110 are coupled together, the second annular surface 174a of the light permeable ring 170a may be abutting the annular end surface 132 of the annular light guide structure 130. Accordingly, the light directed by the annular light guide structure 130 from the at least one light source 150 or each light source 150 to the annular end surface 132 of the annular light guide structure 130 may be transmitted from the annular end surface 132 of the annular light guide structure 130 into the light permeable ring 170a of the control-stickcap 160a so as to illuminate the light permeable ring 170a. According to various embodiments, the illumination of the light permeable ring 170a may be visible via the first annular surface 172a of the light permeable ring 170a that is exposed from the primary surface 162a of the control-stick-cap 160a.

According to various embodiments, when the control-stick-cap 160a and the stick assembly 110 are coupled together, the second annular surface 174a of the light permeable ring 170a may also be abutting the first end 122 of the outer tube-like opaque wall 120 in addition to the annular end surface 132 of the annular light guide structure 130. According to various embodiments, an outer diameter of the second annular surface 174a of the light permeable ring 170a may be larger than an outer diameter of the of the first end 122 of the outer tube-like opaque wall 120. Accordingly, an outer periphery portion 175a of the second annular surface 174a of the light permeable ring 170a may remain outside an outer circumference of the first end 122 of the outer tube-like opaque wall 120 and be exposed. Hence, the illumination of the light permeable ring 170a may also be visible via the outer periphery portion 175a of the second annular surface 174a of the light permeable ring 170a that is exposed from the underneath surface 164a of the control-stick-cap 160a. Thus, according to various embodiments, the outer periphery portion 175a of the second annular surface 174a of the light permeable ring 170a may remain exposed and non-covered by the stick assembly 110.

According to various embodiments, the control-stick-cap 160a may include a stick-engagement-element 166a disposed at a position of the underneath surface 164a of the plate-like structure 161a corresponding to a centre or an annulus centre of the second annular surface 174a of the light permeable ring 170a. Accordingly, the stick-engagement-element 166a may be disposed at the underneath surface 164a of the plate-like structure 161a for engaging with the stick assembly 110 so as to couple the control-stick-cap 160a to the stick assembly 110.

According to various embodiments, the first axial end 142 of the elongated central axial member 140 may include a cap-engagement-element 143 for engaging with the control-stick-cap 160a. Accordingly, the cap-engagement-element 143 may be at the first axial end 142 of the elongated central axial member 140 for engaging with the control-stick-cap 160a so as to couple the control-stick-cap 160a to the stick assembly 110.

According to various embodiments, the stick-engagement-element 166a of the control-stick-cap 160a may be in engagement with the cap-engagement-element 143 of the first axial end 142 of the elongated central axial member 140 of the stick assembly 110 so as to couple the control-stick-cap 160a to the stick assembly 110. According to various embodiments, the stick-engagement-element 166a of the control-stick-cap 160a and the cap-engagement-element 143 of the elongated central axial member 140 may be configured to be engaged to each other in a manner so as to be removable. According to various embodiments, the stick-engagement-element 166a of the control-stick-cap 160a may include a protrusion 167a and the cap-engagement-element 143 of the elongated central axial member 140 may include a hole 143a extending longitudinally from the first axial end 142 of the elongated central axial member 140, or vice versa. Accordingly, the control-stick-cap 160a may be engaged to the elongated central axial member 140 of the stick assembly 110 with the protrusion 167a inserted into the hole 143a.

Figure 1E:
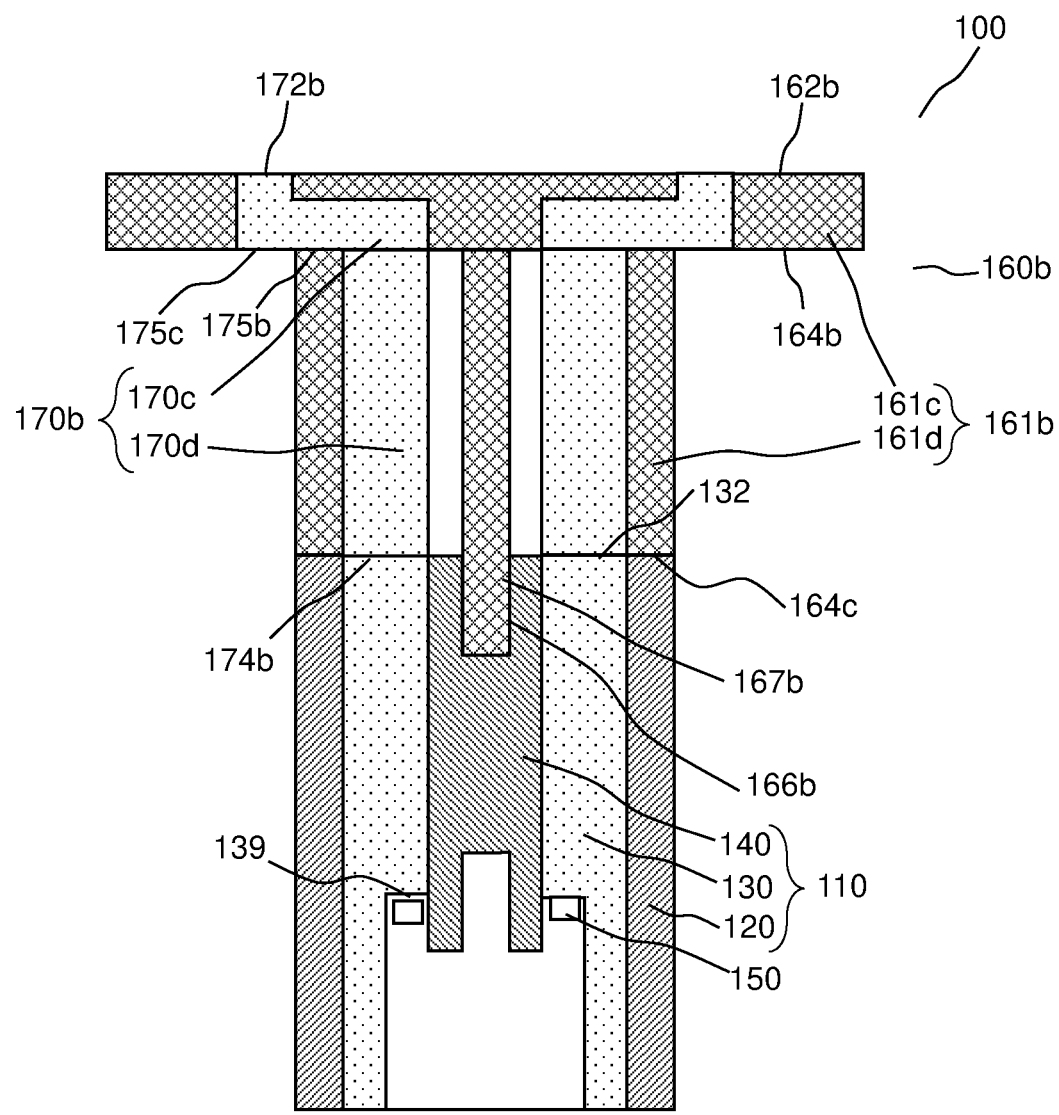
FIG. 1E shows a further details of the control stick of FIG. 1A with a second type of control-stick-cap coupled to the stick assembly according to various embodiments.
Figure 1F:
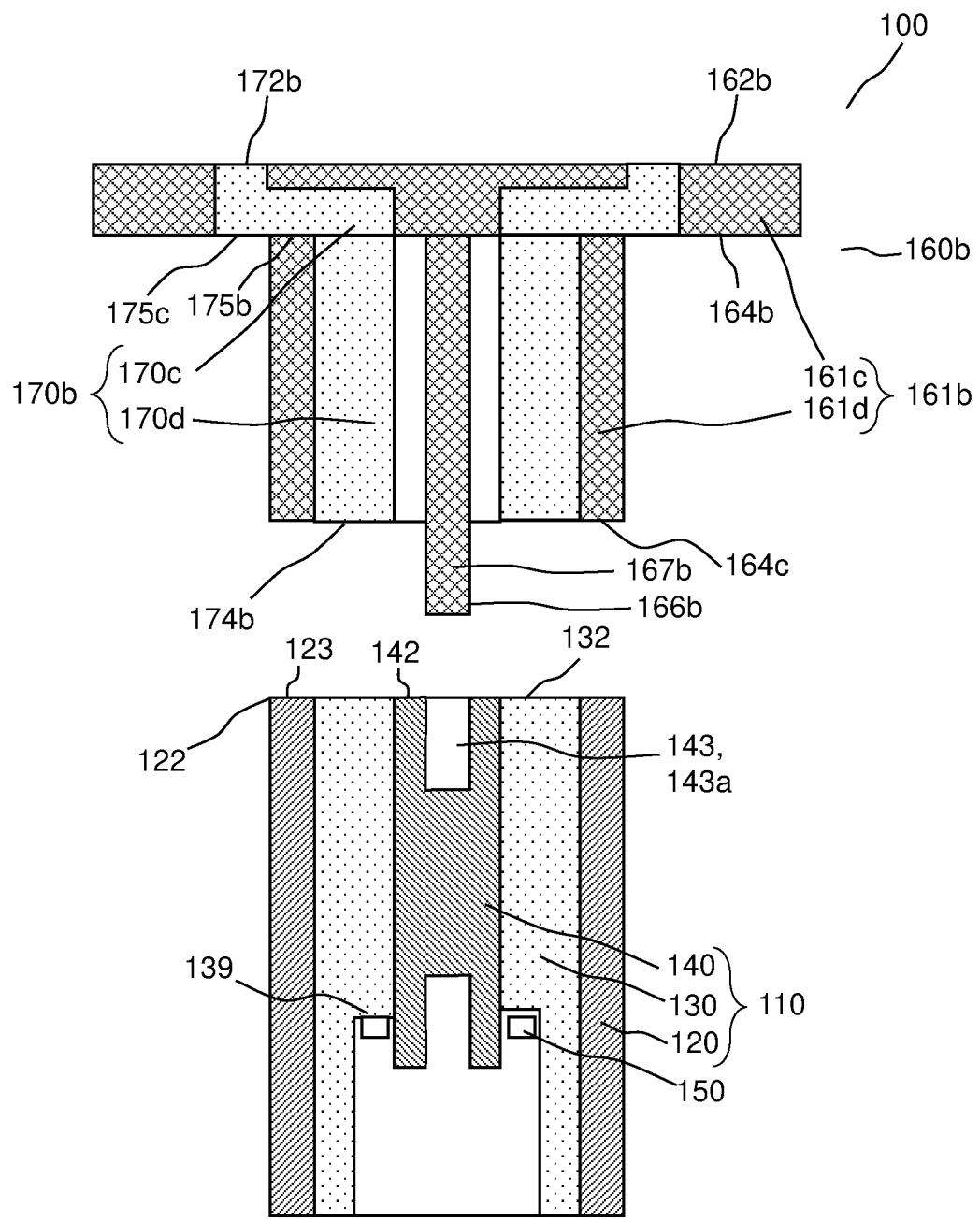
FIG. 1F shows the control-stick-cap of FIG. 1E being separated from the stick assembly 110 according to various embodiments.

FIG. 1E shows a further details of the control stick 100 of FIG. 1A with a second type of control-stick-cap 160b coupled to the stick assembly 110 according to various embodiments. FIG. 1F shows the control-stick-cap 160b of FIG. 1E being separated from the stick assembly 110 according to various embodiments. According to various embodiments, the second type of control-stick-cap 160b may differ from the first type of control-stick-cap 160a in that the second type of control-stick-cap 160b may have a height extension portion such that an overall height of the second type of control-stick-cap 160b coupled to the stick assembly 110 may be higher than an overall height of the first type of control-stick-cap 160a coupled to the stick assembly 110.

Referring to FIG. 1E and FIG. 1F, According to various embodiments, the control stick 100 may include the control-stick-cap 160b. According to various embodiments, the control-stick-cap 160b and the stick assembly 110 may be removably couplable to each other. Accordingly, the control-stick-cap 160b may be coupled to the stick assembly 110 in a manner so as to be removable.

According to various embodiments, the control-stick-cap 160b may include a cap body 161b. According to various embodiments, the cap body 161b may include a plate-like portion 161c and a stem portion 161d. According to various embodiments, the plate-like portion 161c may be similar or may resemble or serve to function like the plate-like structure 161a of the control-stick-cap 160a of FIG. 1C and FIG. 1D. Accordingly, the plate-like portion 161c of the cap body 161b of the control-stick-cap 160b may, similar to the plate-like structure 161a of the control-stick-cap 160a, be of a circular shape or a disc shape. According to various embodiments, the plate-like portion 161c of the cap body 161b of the control-stick-cap 160b may, similar to the plate-like structure 161a of the control-stick-cap 160a, have a primary surface 162b and an underneath surface 164b. The underneath surface 164b may be opposite the primary surface 162b. Accordingly, the primary surface 162b and the underneath surface 164b may be two opposite broad surfaces of the plate-like portion 161c of the cap body 161b of the control-stick-cap 160b. According to various embodiments, the stem portion 161d of the cap body 161b of the control-stick-cap 160b may serve as the additional height extension portion which may make the control-stick-cap 160b taller than the control-stick-cap 160a. According to various embodiments, the stem portion 161d of the cap body 161b of the control-stick-cap 160b may be extending from the underneath surface 164b of the plate-like portion 161c of the cap body 161b of the control-stick-cap 160b. According to various embodiments, the stem portion 161d of the cap body 161b of the control-stick-cap 160b may be extending perpendicularly from the underneath surface 164b of the plate-like portion 161c of the cap body 161b of the control-stick-cap 160b such that a longitudinal section across the plate-like portion 161c and the stem portion 161d has a T-shaped profile.

According to various embodiments, the control-stick-cap 160b may include a light permeable annular structure 170b embedded in the cap body 161b. According to various embodiments, the light permeable annular structure 170b may be similar or may serve or function like the light permeable ring 170a of the control-stick-cap 160a of FIG. 1C and FIG. 1D. According to various embodiments, the light permeable annular structure 170b may include a first annular surface 172b exposed through the primary surface 162b of the plate-like portion 161c of the cap body 160b and a second annular surface 174b exposed through a base 164c of the stem portion 161d of the cap body 160b. The first annular surface 172b of the light permeable annular structure 170b and the second annular surface 174b of the light permeable annular structure 170b may be opposite end surfaces of the light permeable annular structure 170b. Accordingly, the light permeable annular structure 170b may be set in or fixed into the cap body 161b such that the first annular surface 172b and the second annular surface 174b may be respectively exposed through the primary surface 162b of the plate-like portion 161c of the cap body 160b and the base 164c of the stem portion 161d of the cap body 160b. The base 164c of the stem portion 161d of the cap body 160b may be farthest from the plate-like portion 161c of the cap body 161b. According to various embodiments, only the first annular surface 172b and the second annular surface 174b of the light permeable annular structure 170b may be exposed, and the remaining surfaces of the light permeable annular structure 170b may be concealed or covered or surrounded or enclosed by the cap body 161b. According to various embodiments, the light permeable annular structure 170b may be made of light diffusing material such that light may be distributed evenly throughout the light permeable annular structure 170b.

According to various embodiments, when the control-stick-annular structure 170b cap 160b and the stick assembly 110 are coupled together, the second annular surface 174b of the light permeable annular structure 170b may be abutting the annular end surface 132 of the annular light guide structure 130. Accordingly, the light directed by the annular light guide structure 130 from the at least one light source 150 or each light source 150 to the annular end surface 132 of the annular light guide structure 130 may be transmitted from the annular end surface 132 of the annular light guide structure 130 into the light permeable annular structure 170b of the control-stick-cap 160b so as to illuminate the light permeable annular structure 170b. According to various embodiments, the illumination of the light permeable annular structure 170b may be visible via the first annular surface 172b of the light permeable annular structure 170b that is exposed from the primary surface 162b of the plate-like portion 161c of the cap body 161b of the control-stick-cap 160b.

According to various embodiments, the light permeable annular structure 170b may include a ring portion 170c and a hollow cylindrical portion 170d. According to various embodiments, the ring portion 170c and the hollow cylindrical portion 170d may be coaxial. According to various embodiments, the hollow cylindrical portion 170d may be extending from the ring portion 170c. Accordingly, the light permeable annular structure 170b may be a monolithic structure having the ring portion 170c followed by the hollow cylindrical portion 170d along an axis of the light permeable annular structure 170b. Hence, the ring portion 170c and the hollow cylindrical portion 170d may have a common axis and may be adjoining. According to various embodiments, the first annular surface 172b of the light permeable annular structure 170b may be an annular surface of the ring portion 170c farthest away from the hollow cylindrical portion 170d. According to various embodiments, the second annular surface 174b of the light permeable annular structure 170b may be a base annular surface of the hollow cylindrical portion 170d farthest from the ring portion 170c.

According to various embodiments, when the light permeable annular structure 170b is embedded in the cap body 160b, the ring portion 170c of the light permeable annular structure 170b may be in the plate-like portion 161c of the cap body 161b of the control-stick-cap 160b and the hollow cylindrical portion 170d of the light permeable annular structure 170b may be in the stem portion 161d of the cap body 161b of the control-stick-cap 160b. According to various embodiments, the light permeable annular structure 170b may be embedded in the cap body 160b such that a transition between the ring portion 170c of the light permeable annular structure 170b and the hollow cylindrical portion 170d of the light permeable annular structure 170b may coincide with a transition between the plate-like portion 161c of the cap body 161b of the control-stick-cap 160b and the stem portion 161d of the cap body 161b of the control-stick-cap 160b.

According to various embodiments, an outer diameter of the ring portion 170c of the light permeable annular structure 170b at the transition between the ring portion 170c and the hollow cylindrical portion 170d may be larger than an outer diameter of the hollow cylindrical portion 170d of the light permeable annular structure 170b at the transition between the ring portion 170c and the hollow cylindrical portion 170d. Accordingly, the ring portion 170c may form an annular surface 175b around the hollow cylindrical portion 170d at the transition between the ring portion 170c and the hollow cylindrical portion 170d. According to various embodiments, when the transition between the ring portion 170c and the hollow cylindrical portion 170d of the light permeable annular structure 170b coincides with the transition between the plate-like portion 161c and the stem portion 161d of the cap body 161b, the outer diameter of the ring portion 170c of the light permeable annular structure 170b at the transition between the plate-like portion 161c and the stem portion 161d of the cap body 161b may be larger than the outer diameter of the hollow cylindrical portion 170d of the light permeable annular structure 170b at the transition between the plate-like portion 161c and the stem portion 161d of the cap body 161b. According to various embodiments, the outer diameter of the ring portion 170c of the light permeable annular structure 170b at the transition between the plate-like portion 161c and the stem portion 161d of the cap body 161b may be larger than a diameter of the stem portion 161d of the cap body 161b at the transition between the plate-like portion 161c and the stem portion 161d of the cap body 161b. Accordingly, an outer periphery portion of the annular surface 175b may remain outside an outer circumference of the stem portion 161d of the cap body 161b at the transition between the plate-like portion 161c and the stem portion 161d of the cap body 161b so as to form an overhang annular surface 175c exposed through the underneath surface 164b of the plate-like portion 161c of the cap body 161b and surrounding the stem portion 161d of the cap body 161b. Accordingly, the illumination of the light permeable annular structure 170b may also be visible via the overhang annular surface 175c that is exposed from the underneath surface 164b of the plate-like portion 161c of the cap body 161b. Hence, according to various embodiments, the overhang annular surface 175c of the light permeable annular structure 170b may remain exposed and non-covered by the cap body 161b.

According to various embodiments, the control-stick-cap 160b may, similar to the control-stick-cap 160a of FIG. 1C and FIG. 1D, include a stick-engagement-element 166b disposed at a position corresponding to a centre or an annulus centre of the second annular surface 174b of the light permeable annular structure 170b. Accordingly, the stick-engagement-element 166a may be disposed at the base 164c of the stem portion 161d of the cap body 161b of the control-stick-cap 160b for engaging with the stick assembly 110 so as to couple the control-stick-cap 160b to the stick assembly 110.

According to various embodiments, the cap-engagement-element 143 at the first axial end 142 of the elongated central axial member 140 may engage with the control-stick-cap 160a. Accordingly, the cap-engagement-element 143 may be at the first axial end 142 of the elongated central axial member 140 for engaging with the control-stick-cap 160b so as to couple the control-stick-cap 160b to the stick assembly 110.

According to various embodiments, the stick-engagement-element 166b of the control-stick-cap 160b may be in engagement with the cap-engagement-element 143 of the first axial end 142 of the elongated central axial member 140 of the stick assembly 110 so as to couple the control-stick-cap 160b to the stick assembly 110. According to various embodiments, the stick-engagement-element 166b of the control-stick-cap 160b and the cap-engagement-element 143 of the elongated central axial member 140 may be configured to be engaged to each other in a manner so as to be removable. According to various embodiments, the stick-engagement-element 166b of the control-stick-cap 160b may include a protrusion 167b protruding from the base 164c of the stem portion 161d of the cap body 161b of the control-stick-cap 160b, and the cap-engagement-element 143 of the elongated central axial member 140 may include a hole 143a extending longitudinally from the first axial end 142 of the elongated central axial member 140, or vice versa. Accordingly, the control-stick-cap 160b may be engaged to the elongated central axial member 140 of the stick assembly 110 with the protrusion 167b inserted into the hole 143a.

Figures 2A, 2B:
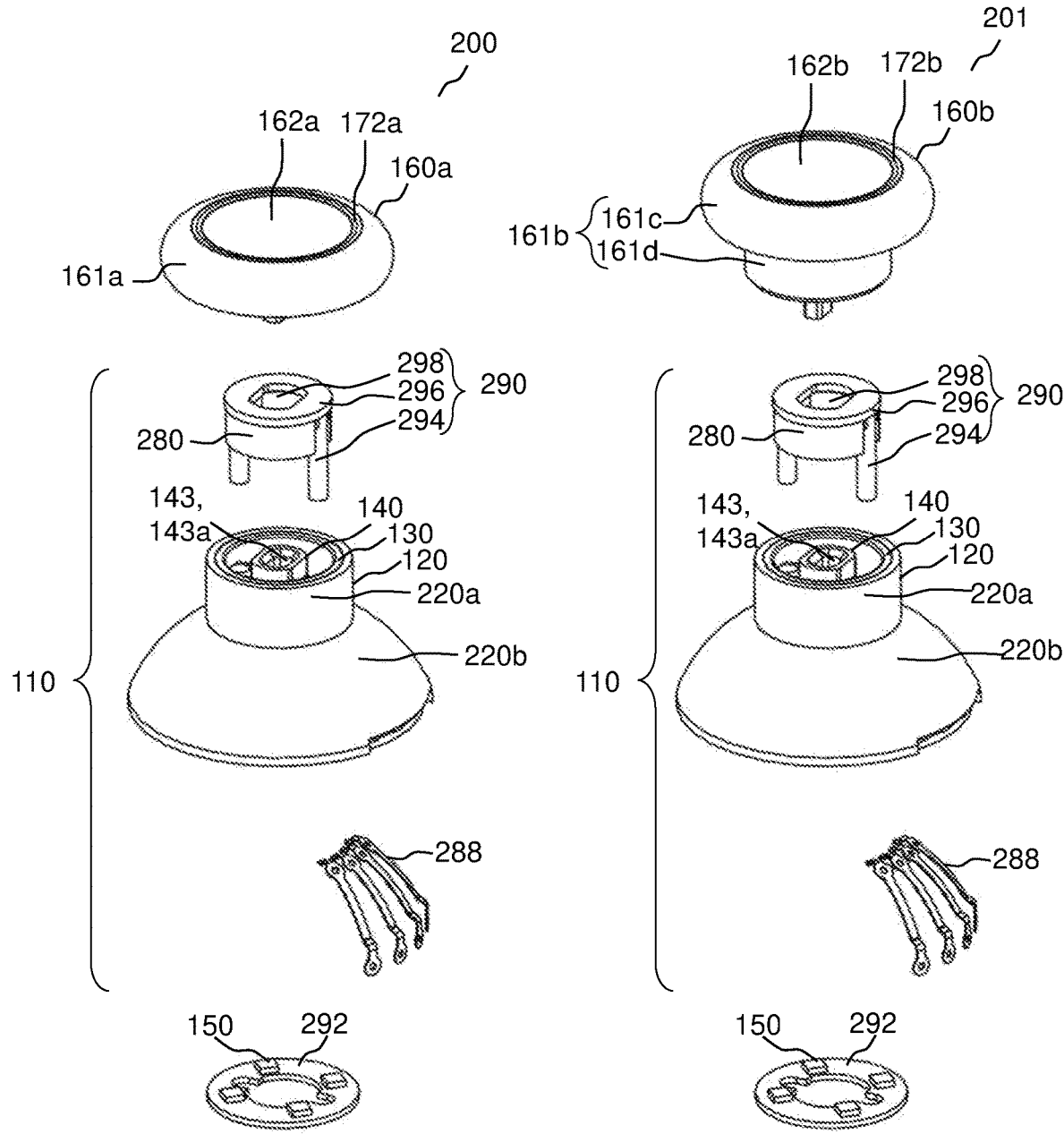
FIG. 2A shows an exploded view of a control stick with the first type of control-stick-cap, as an example of the control stick shown in FIG. 1C and FIG. 1D, according to various embodiments.
FIG. 2B shows an exploded view of a control stick with the second type of control-stick-cap, as an example of the control stick shown in FIG. 1E and FIG. 1F, according to various embodiments.
Figure 2C:
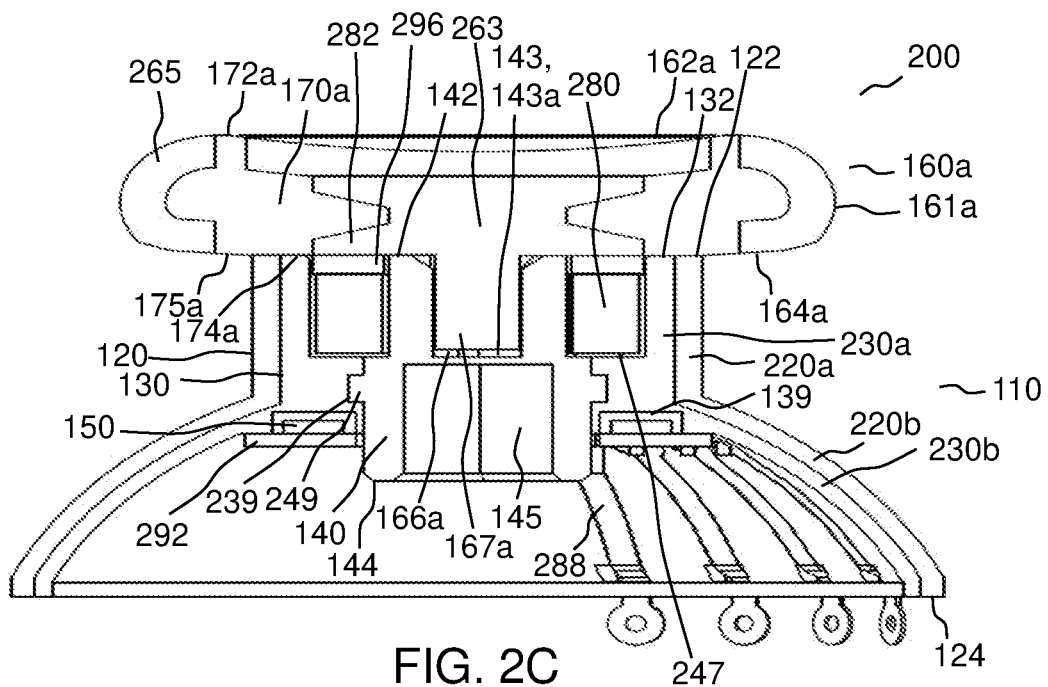
FIG. 2C shows a sectional view of the assembled control stick of FIG. 2A according to various embodiments.
Figure 2D:
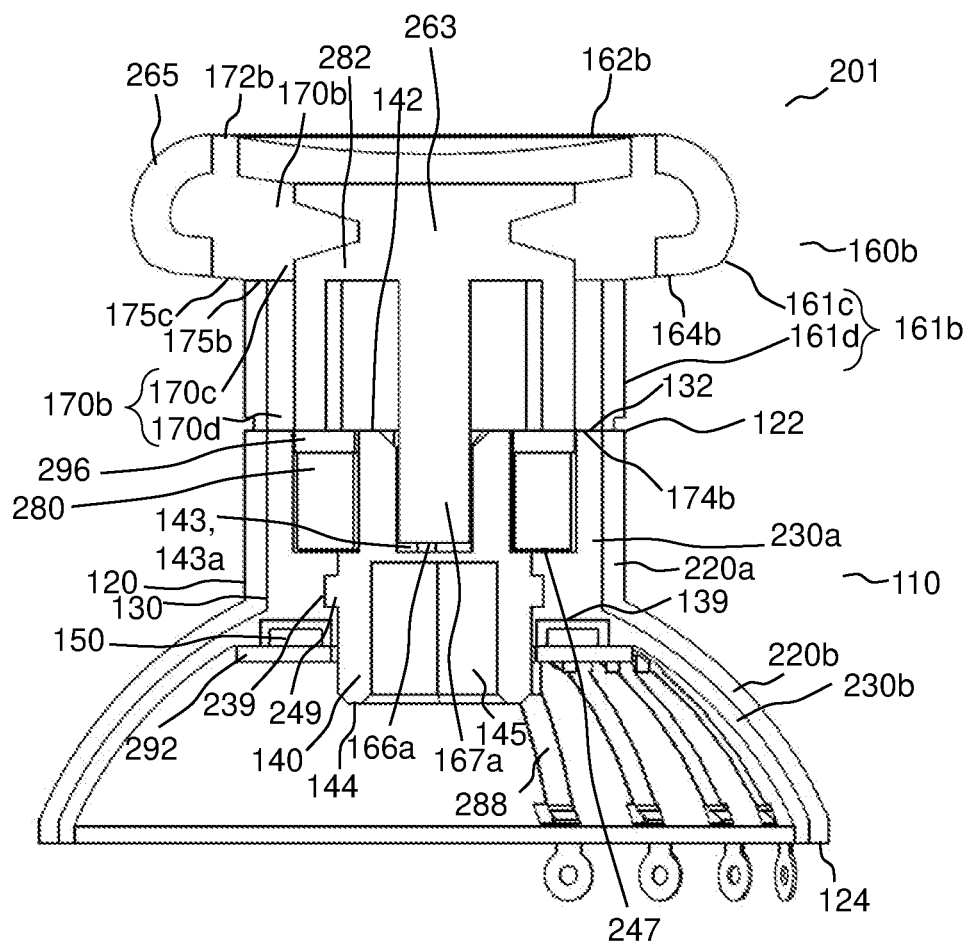
FIG. 2D shows a sectional view of the assembled control stick of FIG. 2B according to various embodiments.
Figure 2E:
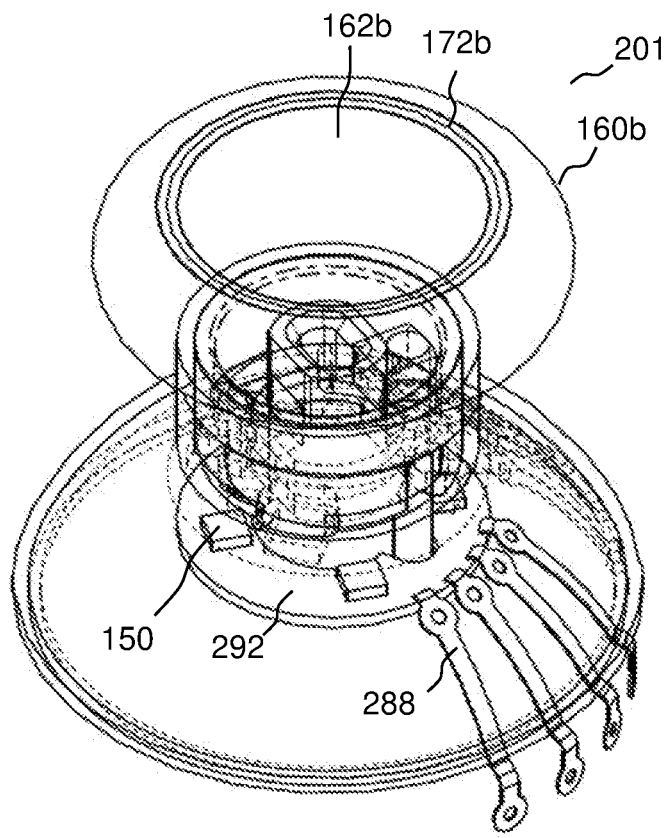
FIG. 2E shows a see-through perspective view of the assembled control stick of FIG. 2B according to various embodiments.
Figures 2F, 2G:
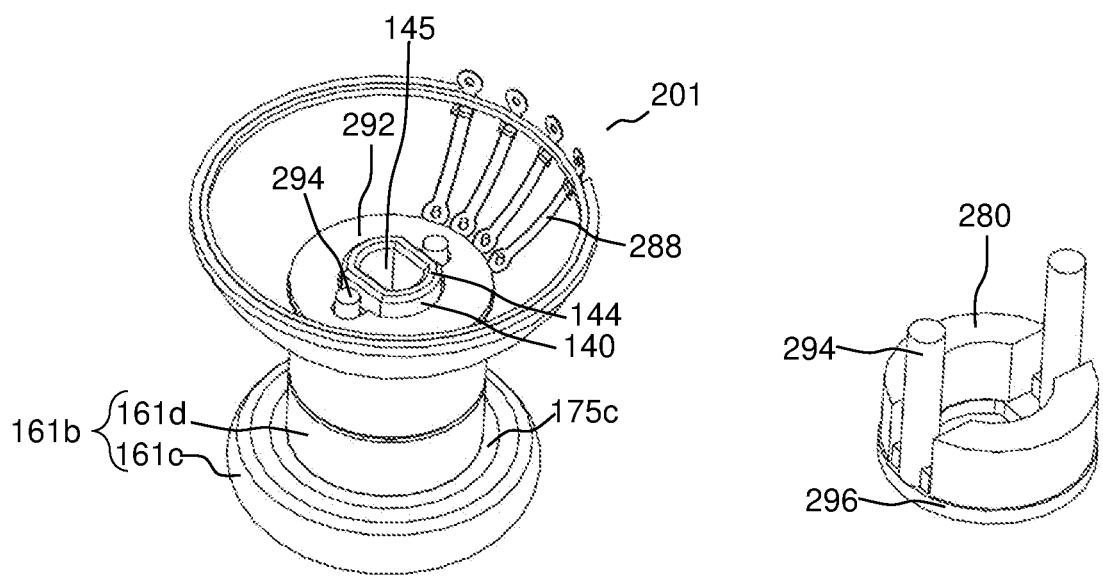
FIG. 2F shows an underside perspective view of the assembled control stick of FIG. 2B according to various embodiments.
FIG. 2G shows a retaining member and a magnet according to various embodiments.

FIG. 2A shows an exploded view of a control stick 200 with the first type of control-stick-cap 160a, as an example of the control stick 100 shown in FIG. 1C and FIG. 1D, according to various embodiments. FIG. 2B shows an exploded view of a control stick 201 with the second type of control-stick-cap 160b, as an example of the control stick 100 shown in FIG. 1E and FIG. 1F, according to various embodiments. According to various embodiments, the control sticks 200, 201 are provided to illustrate example implementations of the control stick 100 of FIG. 1A to FIG. 1F. Accordingly, the control sticks 200, 201 include all the features and limitations of the control stick 100 of FIG. 1A to FIGS. 1F and 1s described in the following with the same reference characters referring to the same/common parts throughout. FIG. 2C shows a sectional view of the assembled control stick 200 of FIG. 2A according to various embodiments. FIG. 2D shows a sectional view of the assembled control stick 201 of FIG. 2B according to various embodiments. FIG. 2E shows a see-through perspective view of the assembled control stick 201 of FIG. 2B according to various embodiments. FIG. 2F shows an underside perspective view of the assembled control stick 201 of FIG. 2B according to various embodiments.

According to various embodiments, the control stick 200, 201 may be a thumbstick, an analogue stick, a joystick, a control column, a center stick, or any suitable pivotable lever control for two dimensional directions or movements inputs. According to various embodiments, the control stick 200, 201 may include the stick assembly 110. Referring to FIG. 2A, according to various embodiments, the control stick 200 may include the control-stick-cap 160a. According to various embodiments, the control-stick-cap 160a and the stick assembly 110 may be removably couplable to each other. Accordingly, the control-stick-cap 160a may be coupled to the stick assembly 110 in a manner so as to be removable. Referring to FIG. 2B, according to various embodiments, the control stick 201 may include the control-stick-cap 160b. According to various embodiments, the control-stick-cap 160b and the stick assembly 110 may be removably couplable to each other. Accordingly, the control-stick-cap 160b may be coupled to the stick assembly 110 in a manner so as to be removable. According to various embodiments, the stick assembly 110 may be configured to selectively receive or interface with or couple with the first type of control-stick-cap 160a or the second type of control-stick-cap 160b so as to be interchangeable between the two types of control-stick-caps. Accordingly, the first type of control-stick-cap 160a any the second type of control-stick-cap 160b may be interchangeable or swappable for coupling with the stick assembly 110.

According to various embodiments, the stick assembly 110 of the control stick 200, 201 may include the outer tube-like opaque wall 120. According to various embodiments, the outer-tube-like opaque wall 120 may be of any suitable shape. As shown in FIG. 2C and FIG. 2D, according to various embodiments, the outer tube-like opaque wall 120 may include a cylindrical portion 220a extending from the first end 122 followed by a dome-like portion 220b with a base of the dome-like portion 220b being the second end 124 of the outer tube-like opaque wall 120. Accordingly, the outer tube-like opaque wall 120 may be a monolithic structure having a straight segment formed by the cylindrical portion 220a and a flared end formed by the dome-like portion 220b. According to various embodiments, the cylindrical portion 220a and the dome-like portion 220b of the outer tube-like opaque wall 120 may be coaxial such that the cylindrical portion 220a may be extending upright from an apex of the dome-like portion 220b.

According to various embodiments, the stick assembly 110 of the control stick 200, 201 may include the annular light guide structure 130. According to various embodiments, the annular light guide structure 130 may have a shape corresponding to that of the outer tube-like opaque wall 120. As shown in FIG. 2C and FIG. 2D, according to various embodiments, the annular light guide structure 130 may include a corresponding cylindrical portion 230a extending from the first end 122 of the outer tube-like opaque wall 120 followed by a corresponding dome-like portion 230b with a base of the dome-like portion 230b terminating at the second end 124 of the outer tube-like opaque wall 120. Accordingly, similar to the outer tube-like opaque wall 120, the annular light guide structure 130 may have a straight segment formed by the corresponding cylindrical portion 230a and a flared end formed by the corresponding dome-like portion 230b. According to various embodiments, the corresponding cylindrical portion 230a and the corresponding dome-like portion 230b of the annular light guide structure 130 may be coaxial such that the corresponding cylindrical portion 230a may be extending upright from an apex of the corresponding dome-like portion 230b.

According to various embodiments, the outer tube-like opaque wall 120 may be made of aluminum. According to various embodiments, the annular light guide structure 130 may be made of transparent polycarbonate. According to various embodiments, the annular light guide structure 130 and the outer tube-like opaque wall 120 may be fixedly attached together via various joining methods. For example, the annular light guide structure 130 and the outer tube-like opaque wall 120 may be the adhered together via adhesive. As another example, the annular light guide structure 130 and the outer tube-like opaque wall 120 may be integrally molded by insert molding. As yet another example, the annular light guide structure 130 and the outer tube-like opaque wall 120 may be fitted together via interference fittings. With the annular light guide structure 130 and the outer tube-like opaque wall 120 may be fixedly attached together, the annular light guide structure 130 may line against the interior wall surface 128 of the outer tube-like opaque wall 120. According to various embodiments, the annular light guide structure 130 may extend from the first end 122 to the second end 124 of the outer tube-like opaque wall 120 so as to line against the interior wall surface 128 of the outer tube-like opaque wall 120 in a manner to fully cover or conceal the interior wall surface 128 of the outer tube-like opaque wall 120.

According to various embodiments, the stick assembly 110 of the control stick 200, 201 may include the elongated central axial structure 140. The elongated central axial structure 140 may be fitted inside the annular light guide structure 130 and may be held by the annular light guide structure. According to various embodiments, the elongated central axial structure 140 and the annular light guide structure 130 may be fixedly attached together via various joining methods. For example, the elongated central axial structure 140 and the annular light guide structure 130 may be the adhered together via adhesive. As another example, the elongated central axial structure 140 and the annular light guide structure 130 may be integrally molded by insert molding. As yet another example, the elongated central axial structure 140 and the annular light guide structure 130 may be fitted together via interference fittings. According to various embodiments, the elongated central axial structure 140 may include a circumferential rib 249 surrounding an exterior of the elongated central axial structure 140. According to various embodiments, the annular light guide structure 130 may include a circumferential groove 239 around the internal wall 138 of the annular light guide structure 130. According to various embodiments, the elongated central axial structure 140 and the annular light guide structure 130 may be fixedly attached together via fitting the circumferential rib 249 of the elongated central axial structure 140 into the circumferential groove 239 of the annular light guide structure 130 such that the elongated central axial structure 140 may be held by the annular light guide structure 130. According to various embodiments, instead of the circumferential rib 249, the elongated central axial structure 140 may have a plurality of protrusions along the exterior thereof and the annular light guide structure 130 may have a plurality of corresponding recesses along the internal wall 138 of the annular light guide structure 130. Accordingly, the plurality of protrusions of the elongated central axial structure 140 may be fitted into the plurality of corresponding recesses of the annular light guide structure 130 such that the elongated central axial structure 140 may be held by the annular light guide structure 130.

According to various embodiments, the stick assembly 110 of the control stick 200, 201 may include the at least one light source 150 or the one or more light sources 150 or the plurality of light sources 150. As shown in FIG. 2C and FIG. 2D, according to various embodiments, the at least one light source 150 or the one or more light sources 150 or the plurality of light sources 150 may be disposed at a transition between the corresponding cylindrical portion 230a and the corresponding dome-like portion 230b of the annular light guide structure 130. Accordingly, the at least one light source 150 or the one or more light sources 150 or the plurality of light sources 150 may be disposed along the transition. According to various embodiments, the transition between the corresponding cylindrical portion 230a and the corresponding dome-like portion 230b of the annular light guide structure 130 may form the ledge 139 to which the at least one light source 150 or the one or more light sources 150 or the plurality of light sources 150 may be coupled. According to various embodiments, the at least one light source 150 or the one or more light sources 150 or the plurality of light sources 150 may be coupled to the annular light guide structure 130 along the transition between the corresponding cylindrical portion 230a and the corresponding dome-like portion 230b. According to various embodiments, the at least one light source 150 or each light source 150 may be directed towards the corresponding cylindrical portion 230a from the transition between the corresponding cylindrical portion 230a and the corresponding dome-like portion 230b. Accordingly, the light from the at least one light source 150 or each light source 150 may be transmitted into the annular light guide structure 130 along the corresponding cylindrical portion 230a to the annular end surface 132 the annular light guide structure 130. According to various embodiments, the at least one light source 150 or each light source 150 may include a red green blue (RGB) light emitting diode (LED). As shown, according to various embodiments, there may be four light sources 150 equally distributed around the elongated central axial structure 140.

Referring to FIG. 2C and FIG. 2D, according to various embodiments, the stick assembly 110 may further include a locking element 280. According to various embodiments, the locking element 280 may be disposed at a cap end portion of the outer tube-like opaque wall 120. The cap end portion of the outer tube-like opaque wall 120 may be an end portion of the outer tube-like opaque wall 120 that is directed towards the control-stick-cap 160a, 160b. Accordingly, the cap end portion of the outer tube-like opaque wall 120 may be the end portion towards the first end 122 of the outer tube-like opaque wall 120. According to various embodiments, the locking element 280 may be within the outer tube-like opaque wall 120 and located at the cap end portion of the outer tube-like opaque wall 120. According to various embodiments, the locking element 280 may be configured to lock or secure the control-stick-cap 160a, 160b to the stick assembly 110 in a manner so as to be subsequently removable. Accordingly, the locking element 280 may be configured to temporary lock or secure the control-stick-cap 160a, 160b to the stick assembly 110 such that the control-stick-cap 160a, 160b may be removed when required. According to various embodiments, the locking element 280 may supplement the engagement between the cap-engagement-element 143 of the stick assembly 110 and the stick-engagement element 166a, 166b of the control-stick-cap 160a, 160b so as to prevent accidental separation of the cap-engagement-element 143 of the stick assembly 110 and the stick-engagement element 166a, 166b of the control-stick-cap 160a, 160b. Hence, the locking element 280 may temporary lock or secure the engagement between the cap-engagement-element 143 of the stick assembly 110 and the stick-engagement element 166a, 166b of the control-stick-cap 160a, 160b.

According to various embodiments, the control-stick-cap 160a, 160b may include a corresponding locking element 282. The corresponding locking element 282 may be disposed at a portion of the control-stick-cap 160a, 160b corresponding to the locking element 280 of the stick assembly 110. For example, in the first type of control-stick-cap 160a, the corresponding locking element 282 may be at the underneath surface 164a of the plate-like structure 161a of the control-stick-cap 160a which is abutting the stick assembly 110. As another example, in the second type of control-stick-cap 160b, the corresponding locking element 282 may be at the base 164c of the stem portion 161d of the cap body 160b which is abutting the stick assembly 110. According to various embodiments, the corresponding locking element 282 of the control-stick-cap 160a, 160b may engage with the locking element 280 of the stick assembly 110 to lock the control-stick-cap 160a, 160b to the stick assembly 110. Accordingly, the corresponding locking element 282 of the control-stick-cap 160a, 160b and the locking element 280 of the stick assembly 110 may form an interlocking pair to lock or secure the control-stick-cap 160a, 160b and the stick assembly 110. According to various embodiments, the interlocking pair may include, but not limited to, a pair of magnets, a pair of a magnet and a magnetic material (e.g. metallic material), a pair of tongue and groove, a pair of pin and hole, a pair of snap fit interlocking elements, or a pair of twist and lock interlocking elements.

According to various embodiments, the locking element 280 of the stick assembly 110 may include a magnet. According to various embodiments, the magnet may surround the first axial end 142 of the elongated central axial member 140 so as to be between the elongated central axial member 140 and the annular light guide structure 130. According to various embodiments, the elongated central axial member 140 and/or the annular light guide structure 130 may form a recessed seat 247 from the first axial end 142 of the elongated central axial member 140 for accommodating or receiving the magnet. According to various embodiments, the corresponding locking element 282 of the control-stick-cap 160a, 160b may include at least a portion of the control-stick-cap 160a, 160b abutting the stick assembly 110 being made of magnetic material. Accordingly, the magnet and the magnetic material may engage with each other to temporary lock or secure the control-stick-cap 160a, 160b and the stick assembly 110. According to various embodiments, the magnet and the magnetic material may be reversed such that the locking element 280 of the stick assembly 110 may include at least a portion of the stick assembly 110 being made of magnetic material and the corresponding locking element 282 of the control-stick-cap 160a, 160b may include a magnet. According to various embodiments, the magnet may include a neodymium magnet, e.g. a N52 magnet.

According to various embodiments, when the locking element 280 of the stick assembly 110 includes the magnet, the stick assembly 110 may further include a retaining member 290 to retain the locking element 280 in the form of the magnet within the stick assembly 110. FIG. 2G shows the retaining member 290 and the magnet as the locking element 280 according to various embodiments. According to various embodiments, the retaining member 290 may be configured to retain the magnet within the stick assembly 110 when the control-stick-cap 160a, 160b is being removed or separated from the stick assembly 110. Accordingly, the retaining member 290 may serve as a barrier or a stopper to retain or keep the magnet within the stick assembly 110 as the control-stick-cap 160a, 160b is being pulled away from the stick assembly 110.

According to various embodiments, the retaining member 290 may be fixedly attached to a circuit board 292 having the at least one light source 150 or the one or more light sources 150 or the plurality of light sources 150 so as to cooperatively retain the magnet within the stick assembly 110. Accordingly, the magnet may be held between the retaining member 290 and the circuit board 292. According to various embodiments, the circuit board 292 may include a printed circuit board. According to various embodiments, the retaining member 290 may include pins 294 or legs extending perpendicularly from a plate portion 296 of the retaining member 290 such that the ends of the pins 294 or legs may be fixedly coupled to the circuit board 292. According to various embodiments, the retaining member 290 may include two or more pins 294 or legs. According to various embodiments, the ends of the pins 294 or legs of the retaining member 290 may be fixedly coupled via heatstaking, bonding, welding, adhesive, mechanical fastening, etc., so as to stabilize the retaining member 290 to the circuit board 292. According to various embodiments, the magnet may be held between the plate portion 296 of the retaining member 290 and the circuit board 292. Further, the magnet may be loosely abutting the plate portion 296 of the retaining member 290. According to various embodiments, when the control-stick-cap 160a, 160b is coupled to the stick assembly 110, a top surface of the plate portion 296 of the retaining member 290 may be abutting the control-stick-cap 160a, 160b and a bottom surface of the plate portion 296 of the retaining member 290 may be abutting the magnet. According to various embodiments, the plate portion 296 of the retaining member 290 may include a through-hole 298 whereby the protrusion 167a, 167b from underneath the control-stick-cap 160a, 160b may be inserted therethrough when the control-stick-cap 160a, 160b is coupled to the stick assembly 110. According to various embodiments, the protrusion 167a, 167b may be inserted through the through-hole 298 so as to be inserted into the hole 143a of the first axial end 142 of the elongated central axial member 140 of the stick assembly 110. According to various embodiments, the circuit board 292 may be fixedly coupled to the annular light guide structure 130. As shown, according to various embodiments, the circuit board 292 may have an annular shape for coupling to the annular light guide structure 130.

Referring to FIG. 2C and FIG. 2D, according to various embodiments, the stick assembly 110 may further include at least one connector 288. According to various embodiments, the at least one connector 288 may be in electrical connection with the at least one light source 150 or the one or more light sources 150 or the plurality of light sources 150. According to various embodiments, the at least one connector 288 may be in electrical connection with the at least one light source 150 or the one or more light sources 150 or the plurality of light sources 150 via being connected to the circuit board 292. According to various embodiments, an end of the at least one connector 288 may be exposed from the second end 124 of the outer tube-like opaque wall 120. Accordingly, with the end of the at least one connector 288 exposed, the end of the at least one connector 288 may be subsequently connected to a main circuit board of a controller for controlling and powering the at least one light source 150 or the one or more light sources 150 or the plurality of light sources 150. According to various embodiments, the at least one connector 288 may be a contact spring. According to various embodiments, with the at least one connector 288 being a contact spring, the contact spring may enable ease of connecting the control stick 200, 201 to the main circuit board of the controller for controlling and powering the at least one light source 150 or the one or more light sources 150 or the plurality of light sources 150. According to various embodiments, there may be one connector 288 corresponding to each light source 150. According to various embodiments, there may be four connectors 288 when there are four light sources 150.

According to various embodiments, the control-stick-cap 160a, 160b may include the light permeable ring 170a embedded in the plate-like structure 161a or the light permeable annular structure 170b embedded in the cap body 161b. According to various embodiments, the plate-like structure 161a or the cap body 161b may include core portion 263 and an outer cover portion 265. According to various embodiments, the light permeable ring 170a or the light permeable annular structure 170b may surround the core portion 263 and the outer cover portion 265 may cover or surround the light permeable ring 170a or the light permeable annular structure 170b. According to various embodiments, the core portion 263 may be made of metallic material, or ferromagnetic metallic material. According to various embodiments, the light permeable ring 170a or the light permeable annular structure 170b may be made of polycarbonate with white powder for light diffusion. According to various embodiments, the outer cover portion 265 may include thermoplastic silicone vulcanizate (TP-SiV®) rubber. According to various embodiments, the light permeable ring 170a or the light permeable annular structure 170b and the outer cover portion 265 may be integrally molded via double injection molding. According to various embodiments, the light permeable ring 170a or the light permeable annular structure 170b with the outer cover portion 265 may be fitted over the core portion 263 via interference fitting, interlocking joints, friction, adhesive or bonding.

Various embodiments have provided a control stick for a controller which is capable of enhancing the sensory experience of the user via the additional lighting effects. Various embodiments have also provided a control stick with removable or swappable control-stick-cap which is capable of being illuminated for exhibiting lighting effects.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A control stick comprising:
    a stick assembly comprising
        an outer tube-like opaque wall having a central axis extending between a first end and a second end, the outer tube-like opaque wall having an exterior wall surface and an interior wall surface,
        an annular light guide structure disposed inside the outer tube-like opaque wall in a concentric manner so as to be lined against the interior wall surface of the outer tube-like opaque wall, wherein an annular end surface of the annular light guide structure is flushed with the first end of the outer tube-like opaque wall, and
        an elongated central axial member fitted inside the annular light guide structure and held by the annular light guide structure in an orientation longitudinally aligned with the central axis of the outer tube-like opaque wall, wherein a first axial end of the elongated central axial member is directed in a same first direction as the first end of the outer tube-like opaque wall and a second axial end of the elongated central axial member is directed in a same second direction as the second end of the outer tube-like opaque wall, wherein the second axial end of the elongated central axial member comprises a control-engagement-element for engaging with a control stick mechanism; and
        at least one light source disposed to transmit light to the annular light guide structure in a manner such that the annular light guide structure directs the light to the annular end surface of the annular light guide structure.

2. The control stick as claimed in claim 1, wherein the annular light guide structure is fixedly attached to the outer tube-like opaque wall, and the elongated central axial member is fixedly attached to the annular light guide structure.

3. The control stick as claimed in claim 1, wherein the at least one light source is coupled to the annular light guide structure in a manner so as to transmit light into the annular light guide structure in a direction towards the annular end surface of the annular light guide structure.

4. The control stick as claimed in claim 1, wherein the annular light guide structure comprises a ledge along an inner wall surface of the annular light guide structure.

5. The control stick as claimed in claim 4, wherein the at least one light source is coupled to the ledge of the annular light guide structure and operable to transmit the light into the annular light guide structure such that the light is directed by the annular light guide structure to the annular end surface of the annular light guide structure.

6. The control stick as claimed in claim 1, further comprising a control-stick-cap coupled to the stick assembly,
    wherein the first axial end of the elongated central axial member of the stick assembly comprises a cap-engagement-element for engaging with the control-stick-cap,
    wherein the control-stick-cap comprises
        a plate-like structure having a primary surface and an underneath surface opposite the primary surface;
        a light permeable ring embedded in the plate-like structure in a manner such that a first annular surface of the light permeable ring is exposed through the primary surface of the plate-like structure and a second annular surface of the light permeable ring is exposed through the underneath surface of the plate-like structure, wherein the first annular surface and the second annular surface are opposite surfaces of the light permeable ring; and
        a stick-engagement-element disposed at a position of the underneath surface of the plate-like structure corresponding to a centre of the second annular surface of the light permeable ring,
    wherein the stick-engagement-element of the control-stick-cap is in engagement with the cap-engagement-element of the stick assembly,
    wherein the second annular surface of the light permeable ring is abutting the annular end surface of the annular light guide structure.

7. The control stick as claimed in claim 6, wherein an outer periphery portion of the second annular surface of the light permeable ring remains exposed and non-covered by the stick assembly.

8. The control stick as claimed in claim 6, wherein the cap-engagement-element of the stick assembly and the stick-engagement-element of the control-stick-cap are removably couplable to each other.

9. The control stick as claimed in claim 6, wherein the stick assembly further comprises a locking element disposed at a cap end portion of the outer tube-like opaque wall to lock the control-stick-cap to the stick assembly.

10. The control stick as claimed in claim 9, wherein the locking element comprises a magnet and at least a portion of the control-stick-cap abutting the stick assembly is made of magnetic material,
    wherein the stick assembly further comprises a retaining member to retain the magnetic material within the stick assembly,
    wherein the retaining member is fixedly attached to a circuit board having the at least one light source so as to cooperatively retain the magnet within the stick assembly.

11. The control stick as claimed in claim 9, wherein the control-stick-cap comprises a corresponding locking element disposed at a portion of the control-stick-cap corresponding to the locking element of the stick assembly so as to engage with the locking element of the stick assembly to lock the control-stick-cap to the stick assembly.

12. The control stick as claimed in claim 1, further comprising a control-stick-cap coupled to the stick assembly,
    wherein the first axial end of the elongated central axial member of the stick assembly directed comprises a cap-engagement-element for engaging with the control-stick-cap,
    wherein the control-stick-cap comprises
    a cap body comprising a plate-like portion having a primary surface and an underneath surface opposite the primary surface and a stem portion extending from the underneath surface of the plate-like portion;
    a light permeable annular structure embedded in the cap body in a manner such that a first annular surface of the light permeable annular structure is exposed through the primary surface of the plate-like portion and a second annular surface of the light permeable annular structure is exposed through a base surface of the stem portion, wherein the first annular surface and the second annular surface are opposite end surfaces of the light permeable annular structure; and
    a stick-engagement-element disposed at a position corresponding to a centre of the second annular surface of the light permeable ring,
    wherein the stick-engagement-element of the control-stick-cap is in engagement with the cap-engagement-element of the stick assembly,
    wherein the second annular surface of the light permeable ring is abutting the annular end surface of the annular light guide structure.

13. The control stick as claimed in claim 12, wherein the light permeable annular structure comprises
    a ring portion in the plate-like portion of the cap body; and
    a hollow cylindrical portion in the stem portion of the cap body,
    wherein an outer diameter of the ring portion of the light permeable annular structure at a transition between the plate-like portion and the stem portion of the cap body is larger than an outer diameter of the hollow cylindrical portion of the light permeable annular structure at the transition between the plate-like portion and the stem portion of the cap body so as to form an overhang annular surface exposed through the underneath surface of the plate-like portion of the cap body and surrounding the stem portion of the cap body.

14. The control stick as claimed in claim 12, wherein the cap-engagement-element of the stick assembly and the stick-engagement-element of the control-stick-cap are removably couplable to each other.

15. The control stick as claimed in claim 12, wherein the stick assembly further comprises a locking element disposed at a cap end portion of the outer tube-like opaque wall to lock the control-stick-cap to the stick assembly.

16. The control stick as claimed in claim 15, wherein the locking element comprises a magnet and at least a portion of the control-stick-cap abutting the stick assembly is made of magnetic material,
    wherein the stick assembly further comprises a retaining member to retain the magnet within the stick assembly,
    wherein the retaining member is fixedly attached to a circuit board having the at least one light source so as to cooperatively retain the magnet within the stick assembly.

17. The control stick as claimed in claim 15, wherein the control-stick-cap comprises a corresponding locking element disposed at a portion of the control-stick-cap corresponding to the locking element of the stick assembly so as to engage with the locking element of the stick assembly to lock the control-stick-cap to the stick assembly.

18. The control stick as claimed in claim 1, wherein the annular light guide structure of the stick assembly extends from the first end to the second end of the outer tube-like opaque wall so as to line the interior wall surface of the outer tube-like opaque wall.

19. The control stick as claimed claim 18, wherein the outer tube-like opaque wall of the stick assembly comprises a cylindrical portion extending from the first end followed by a dome-like portion with a base of the dome-like portion being the second end of the outer tube-like opaque wall,
    wherein the annular light guide structure of the stick assembly comprises a corresponding cylindrical portion extending from the first end of the outer tube-like opaque wall followed by a corresponding dome-like portion with a base of the dome-like portion terminating at the second end of the outer tube-like opaque wall, wherein the at least one light source is disposed at a transition between the corresponding cylindrical portion and the corresponding dome-like portion of the annular light guide structure.

20. The control stick as claimed in claim 1, further comprising a at least one connector in electrical connection with the at least one light source wherein an end of the at least one connector is exposed from the second end of the outer tube-like opaque wall.

* * * * *